(12) United States Patent
Anderson

(10) Patent No.: US 12,359,940 B2
(45) Date of Patent: Jul. 15, 2025

(54) OUTDOOR EXPERIENCE SYSTEM

(71) Applicant: Jodi Anderson, Prairie du Sac, WI (US)

(72) Inventor: Jodi Anderson, Prairie du Sac, WI (US)

(*) Notice: Subject to any disclaimer, the term of this patent is extended or adjusted under 35 U.S.C. 154(b) by 328 days.

(21) Appl. No.: 17/390,207

(22) Filed: Jul. 30, 2021

(65) Prior Publication Data
US 2023/0032556 A1 Feb. 2, 2023

(51) Int. Cl.
| | | |
|---|---|---|
| G01C 21/00 | (2006.01) | |
| G01S 19/19 | (2010.01) | |
| G06Q 30/0207 | (2023.01) | |
| G09B 19/00 | (2006.01) | |
| G06F 3/04817 | (2022.01) | |
| G06K 19/06 | (2006.01) | |
| G06K 19/07 | (2006.01) | |

(52) U.S. Cl.
CPC ..... *G01C 21/3896* (2020.08); *G01C 21/3889* (2020.08); *G01S 19/19* (2013.01); *G06Q 30/0209* (2013.01); *G09B 19/003* (2013.01); *G06F 3/04817* (2013.01); *G06K 19/06028* (2013.01); *G06K 19/0723* (2013.01)

(58) Field of Classification Search
CPC . G01C 21/3896; G01C 21/3889; G01S 19/19; G06Q 30/0209; G09B 19/003; G06K 19/06028; G06K 19/0723
See application file for complete search history.

(56) References Cited

U.S. PATENT DOCUMENTS

| | | | |
|---|---|---|---|
| 10,448,866 B1* | 10/2019 | German | G10L 15/22 |
| 11,675,314 B2* | 6/2023 | Nozawa | G04B 47/065 |
| | | | 368/14 |
| 2007/0233367 A1* | 10/2007 | Chen | G01C 21/3881 |
| | | | 701/408 |
| 2011/0276565 A1* | 11/2011 | Zheng | H04W 4/029 |
| | | | 707/E17.084 |
| 2015/0169630 A1* | 6/2015 | Shynar | G06F 16/9537 |
| | | | 707/769 |
| 2015/0182840 A1* | 7/2015 | Regala | G16H 20/30 |
| | | | 434/247 |
| 2015/0248651 A1* | 9/2015 | Akutagawa | G06F 16/2465 |
| | | | 705/7.19 |

(Continued)

FOREIGN PATENT DOCUMENTS

| | | | | |
|---|---|---|---|---|
| CA | 2635954 A1 * | 7/2007 | | G06F 16/00 |
| CA | 3035028 A1 * | 3/2018 | | G06F 16/252 |

(Continued)

*Primary Examiner* — Hongye Liang
*Assistant Examiner* — Nada Mahyoob Alqaderi
(74) *Attorney, Agent, or Firm* — Foley & Lardner LLP

(57) ABSTRACT

Methods and systems that comprise generating a list of outdoor experiences based on information from an adventure seeker network, each outdoor experience including global positioning system (GPS) coordinates, selecting, after generating the list of outdoor experiences, an outdoor experience from the list of outdoor experiences without input from an end user, providing a charm after selecting the outdoor experience, the charm including a geolocator including the GPS coordinates corresponding to the outdoor experience, and providing a guide accompanying the charm and including a route associated with the outdoor experience.

20 Claims, 13 Drawing Sheets

(56) References Cited

U.S. PATENT DOCUMENTS

| | | | | |
|---|---|---|---|---|
| 2016/0189439 A1* | 6/2016 | Vetterick | ................ | G07C 5/006 |
| | | | | 701/29.4 |
| 2018/0233710 A1* | 8/2018 | Hua | ....................... | A41D 1/002 |
| 2022/0004938 A1* | 1/2022 | Nordstrom | ............ | G06F 16/909 |
| 2022/0342942 A1* | 10/2022 | Cheng | ................... | G06F 16/951 |

FOREIGN PATENT DOCUMENTS

| | | | | | |
|---|---|---|---|---|---|
| CN | 104287377 A | * | 1/2015 | | |
| CN | 107727134 A | * | 2/2018 | ........... | G01C 22/006 |
| CN | 115604814 A | * | 1/2023 | | |

* cited by examiner

OUTDOOR EXPERIENCE SYSTEM

BACKGROUND

The present disclosure relates to a system for providing an outdoor experience. More particularly, the present disclosure relates to methods, kits, and systems for guiding a user to a new outdoor location based on input from an adventure seeker network.

SUMMARY

One embodiment relates to a method that includes generating a list of outdoor experiences based on information from an adventure seeker network. Each outdoor experience includes global positioning system (GPS) coordinates. The method also includes selecting, after generating the list of outdoor experiences, an outdoor experience from the list of outdoor experiences without input from an end user, providing a charm after selecting the outdoor experience, and providing a guide accompanying the charm including a route associated with the outdoor experience, wherein the charm including a geolocator includes the GPS coordinates corresponding to the outdoor experience.

Another embodiment relates to a kit that comprises a wearable charm that includes a geolocator, including the global positioning system (GPS) coordinates associated with an outdoor experience selected from a list of outdoor experiences based on information from an adventure seeker network, and a guide accompanying the wearable charm and including a route associated with the outdoor experience.

Another embodiment relates to a system that includes one or more processing circuits having one or more memory devices coupled to one or more processors, the one or more memory devices configured to store instructions thereon that, when executed by the one or more processors, cause the one or more processors to perform operations including receiving a plurality of outdoor experiences from an adventure seeker network, each outdoor experience including global positioning system (GPS) coordinates and a route, generating a list of outdoor experiences based on the plurality of outdoor experiences received from the adventure seeker network, recognizing a geolocator of a charm corresponding to a selected outdoor experience, and providing the GPS coordinates and the route associated with the selected outdoor experience associated with the charm to an end user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures.

DETAILED DESCRIPTION

Following below are more detailed descriptions of various concepts related to, and implementations of, methods, kits, and systems for providing an outdoor experience. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a new outdoor experience is provided to an end user by an outdoor experience system (OES), including information from an adventure seeker network. An end user may seek an outdoor experience to enjoy a new adventure, for health and wellness, aesthetic appeal, etc. Some outdoor experiences within a geographic region may be known to local outdoor enthusiasts. However, many enthusiasts are unfamiliar with the assortment of outdoor experiences that are available locally and nationally, and lack the resources to locate the outdoor experiences. The OES provides the end user with geolocator information, including global positioning system (GPS) coordinates of an outdoor experience, a guide associated with the outdoor experience (e.g., a map and a route), instructions on how to complete the outdoor experience, and a memento commemorating the outdoor experience.

Figure 1:
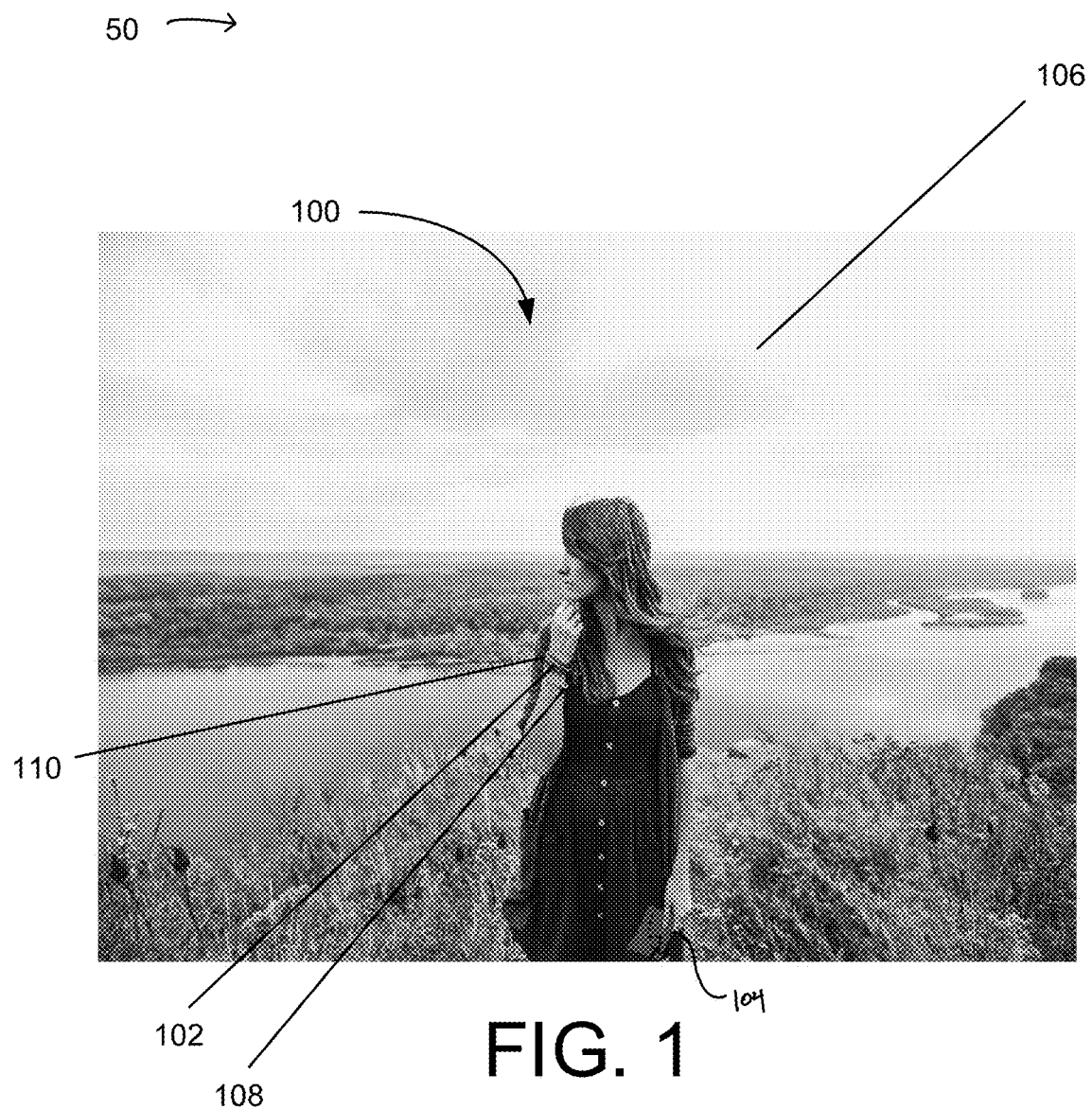
FIG. 1 is a pictorial view of an outdoor experience system, according to an exemplary embodiment.

As shown in FIG. 1, an outdoor experience system (OES) 50 is shown. The OES 50 provides an outdoor experience 100, a charm in the form of a charm bracelet 102, a guide 104, and a scenic setting 106. The charm bracelet 102 further includes a charm 108 and a string 110. In other embodiments, the charm 108 is provided in the form of an earring, a necklace, a lanyard, a pin, a patch, a medallion, a medal, and/or any other type of accessory.

The scenic setting 106 may include a scenic view or picturesque landscape. For example, the scenic setting 106 may include a scenic view of a river from the top of a cliff or mountain. In other embodiments, the scenic setting 106 includes a lake, waterfall, cave, forest, meadow, sunset, iceberg, bluff, valley, etc. The scenic setting 106 may also incorporate outdoor activities, for example walking, running, hiking, biking, rock climbing, horseback riding, canoeing, etc.

Figure 2:
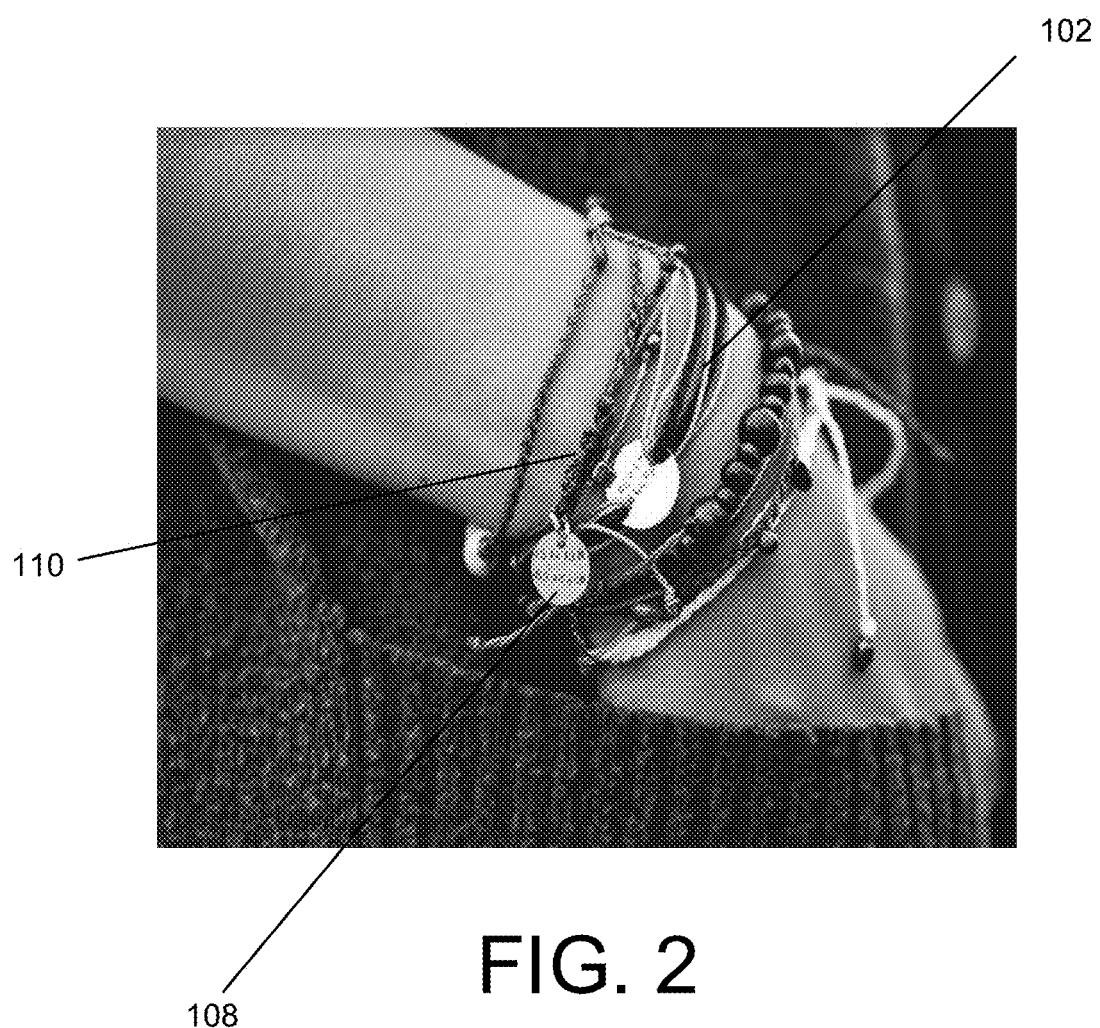
FIG. 2 is a pictorial view of a charm bracelet of the outdoor experience system of FIG. 1, according to an exemplary embodiment.

As shown in FIG. 2, the charm bracelet 102 includes the charm 108 and the string 110 arranged as a bracelet. The charm 108 may have a single hole, and utilize a fastening mechanism (e.g., clasp, hook, clip, pin, buckle, etc.) to fasten the charm 108 to the string 110. The charm 108 may also have two holes, and be configured to receive the string 110 in order to be fastened to a user, clothing, or another accessory. In some embodiments the charm 108 has no holes, and is configured to fasten to the string 110, clothing, backpacks, or other accessories through other fastening mechanisms (e.g., clasp, hook, clip, pin, buckle, etc.). The charm 108 and the string 110 may be combined and fastened as described above, in any combination thereof, or in any other suitable method. In some embodiments, the charm 108 is configured to be added to an existing bracelet of the user (e.g., a collectable charm bracelet).

As shown in FIG. 2, the string 110 may be twine, yarn, rope, fiber, wire, or any other suitable material. In some embodiments, the string 110 is braided, twisted, or decorated, and/or includes additional accessories (e.g., beads, charms, metals, etc.). The string 110 may be color-coded, or decorated to fit an outdoor experience 100.

Figure 3:
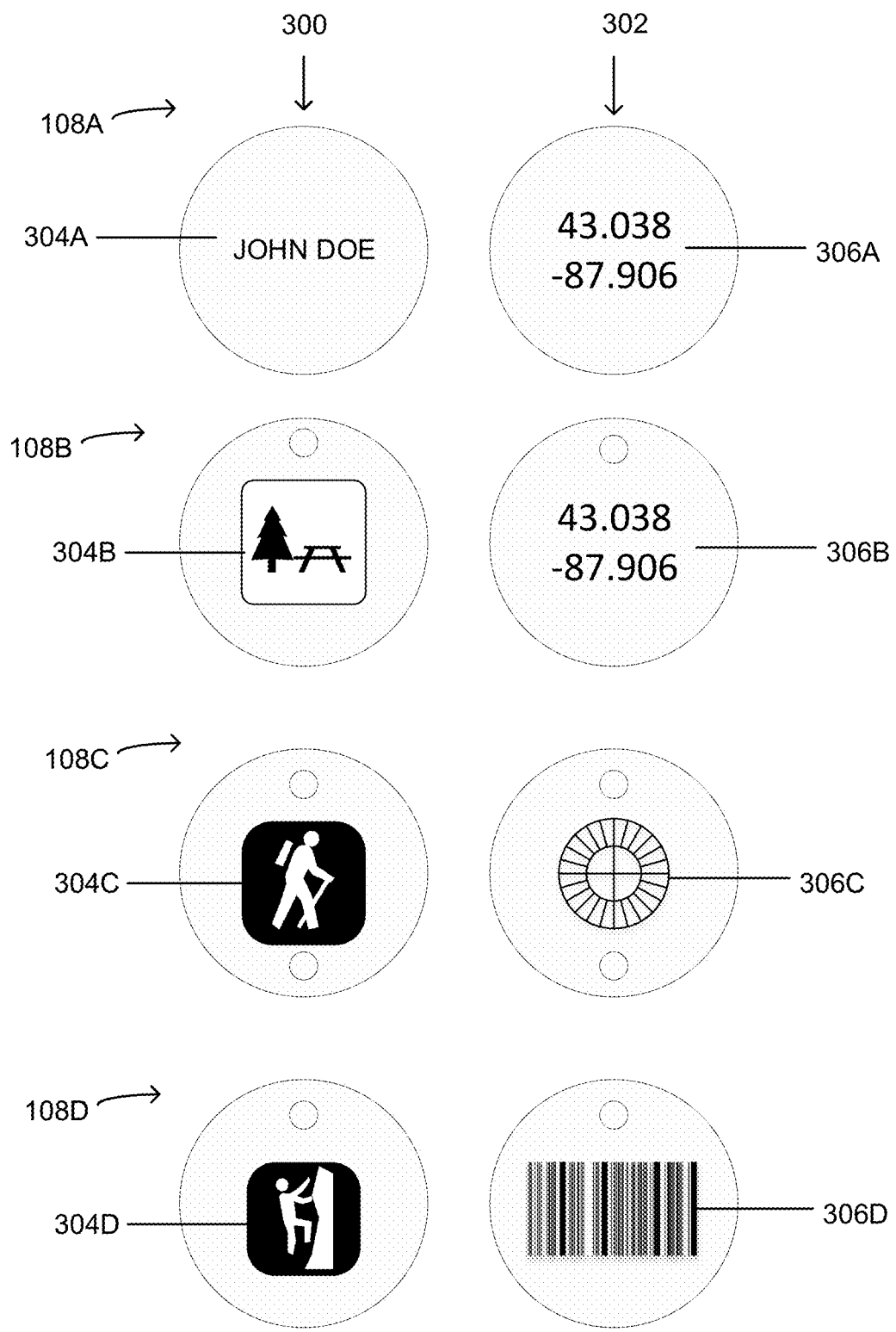
FIG. 3 is a schematic representation of four different charms of the outdoor experience system of FIG. 1, according to an exemplary embodiments.

As shown in FIG. 3, the charm 108 can be arranged as a first charm 108A, a second charm 108B, a third charm 108C, and/or a fourth charm 108D. The charm 108 may generally have a first side 300 and a second side 302. The first side 300 of the charm 108 may include a symbolic object 304. For example, the symbolic object 304 may include an end user's name (e.g., JOHN DOE 304A), outdoor symbols (e.g., a picnic symbol 304B, a hiking symbol 304C, a rock climbing symbol 304D), or any other suitable symbol (e.g., a park name, logo, sign, etc.) to commemorate the outdoor experience 100. The second side 302 of the charm 108 may also include a geolocator 306. The geolocator 306 may be any object or symbol indicative of geographical location data, for example global positioning coordinates (GPS) (e.g., GPS coordinates 306A and GPS coordinates 306B), a radio frequency identification (RFID) device 306C, a barcode 306D, or any other suitable geolocator 306 (e.g., a QR code, a NFC device, etc.) relating to the outdoor experience 100.

As shown in FIG. 3, the charm 108 may have any number of holes to fasten the charm 108 to the string 110 or any suitable accessory. For example, the charm 108 may have no holes (e.g., the first charm 108A), one hole (e.g., the second charm 108B), two holes (e.g., the third charm 108C), or any number of suitable holes. In an exemplary embodiment, the charm 108 is made of any suitable metal (e.g., brass, iron, copper, zinc, etc.). In other embodiments, the charm 108 is made of wood, plastic, leather, or any other suitable material. In yet other embodiments, the charm 108 is any suitable accessory, such as a patch, pin, sticker, keychain, medallion, coin, etc.

Figure 4:
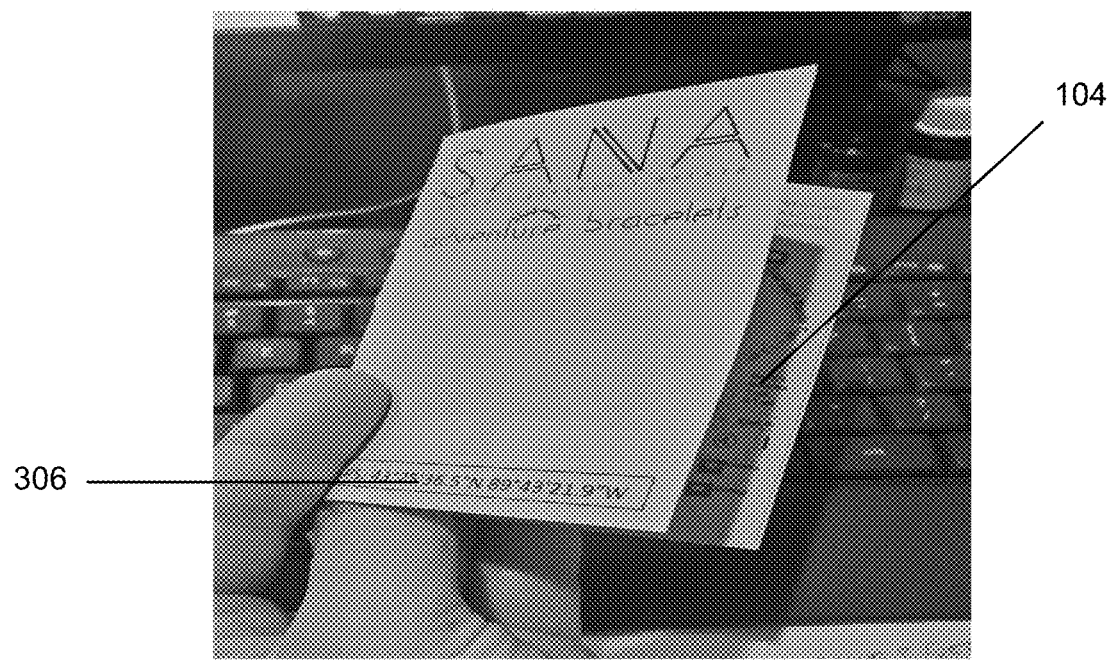
FIG. 4 is a pictorial view of a guide of the outdoor experience system of FIG. 1, according to an exemplary embodiment.
Figure 5:
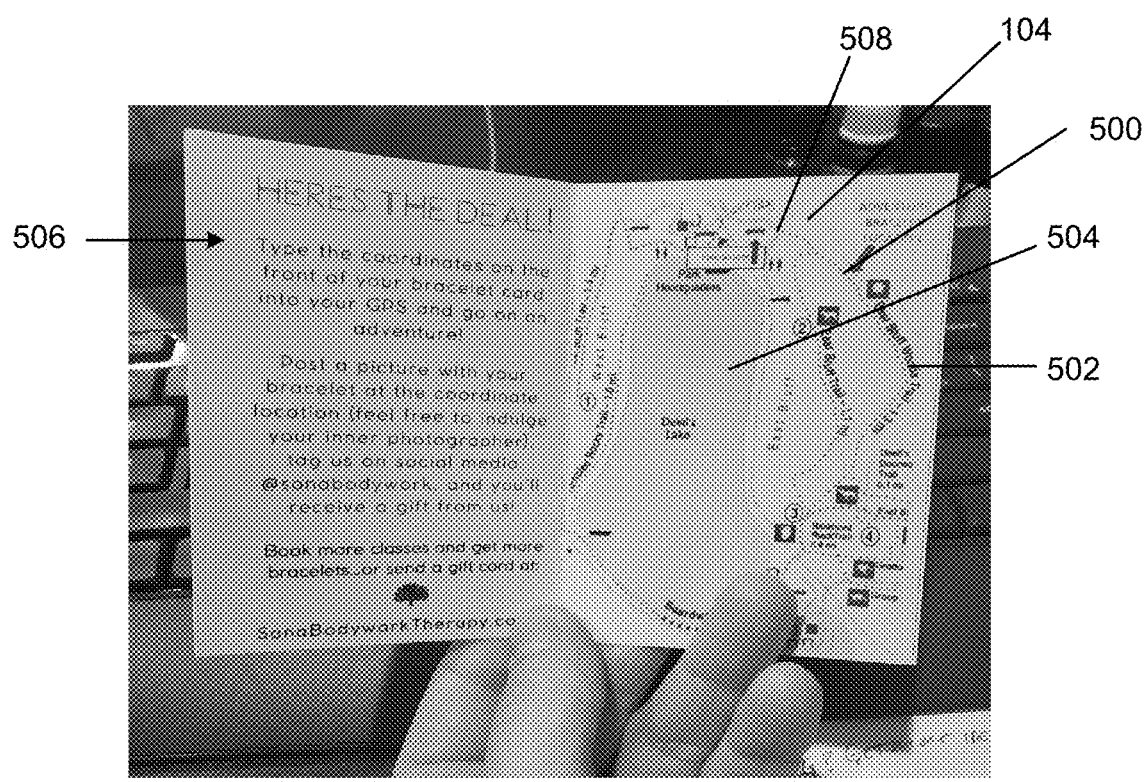
FIG. 5 is a pictorial view of the guide of FIG. 4, according to an exemplary embodiment.

As shown in FIGS. 4-5, the guide 104 includes a geolocator 306 that provides location information (e.g., GPS coordinates) identifying an outdoor experience location 500, a route 502, a map 504, and instructions 506 relating to the outdoor experience 100. The guide 104 may be made of card stock, paper stock, or any other suitable paper material, and may incorporate the geolocator 306 information as written GPS coordinates, a barcode, an RFID device, a QR code, or any other suitable method of relaying the outdoor experience location 500 information. In some embodiments, the guide 104 is presented via a mobile user interface, graphical user interface, or other suitable interface, and the geolocator 306 is a digital geolocator, as discussed below.

As shown in FIG. 5, the route 502 may be illustrated in the map 504 as a single route or with a plurality of routes, and the guide 104 may include other relevant information relating to the route 502. For example, the guide 104 may indicate the difficulty of the route 502, the distance to/from certain locations (e.g., a starting location 508) to the outdoor experience location 500, the time it takes to reach the outdoor experience location 500, locations to stop along the route 502, etc. Similarly, the map 504 may illustrate the route 502 and other relevant information regarding the route 502. For example, the map 504 may include information regarding parking locations near the route 502, where to begin the route 502 (e.g., the starting location 508), other routes in the area, information on the surrounding geographical landscape, other recreational areas or buildings near the route 502, and/or any combination thereof.

As shown in FIG. 5, the instructions 506 may include messages for the end user. For example, the instructions 506 may instruct the end user to follow the route 502 using the guide 104, instruct the end user to follow the route 502 using the map 504, and/or instruct the user to type the outdoor experience location 500 information (e.g., GPS coordinates) into a mobile application, navigational device, or other suitable smart device, and follow the route and the map provided by the application and/or device. The instructions 506 may also instruct the end user to take a picture of the outdoor experience 100 at the outdoor experience location 500, and/or share the picture at the outdoor experience location 500 on a mobile application, online, or in any other suitable social media platform or public forum. In an exemplary embodiment, the instructions 506 instruct the end user to user to take a picture of the outdoor experience 100 at the outdoor experience location 500 with the charm bracelet 102 in the picture. In some embodiments the instructions 506 indicate that the end user will be provided a prize if the end user shares the picture of the outdoor experience 100 with the charm bracelet 102 in various public forums (e.g., in a mobile application, social media site, at the local park, etc.). In other embodiments, the instructions 506 are presented via a mobile user interface, graphical user interface, or other suitable interface, and the instructions 506 are executed in a mobile application or other digital platform.

Figure 6:
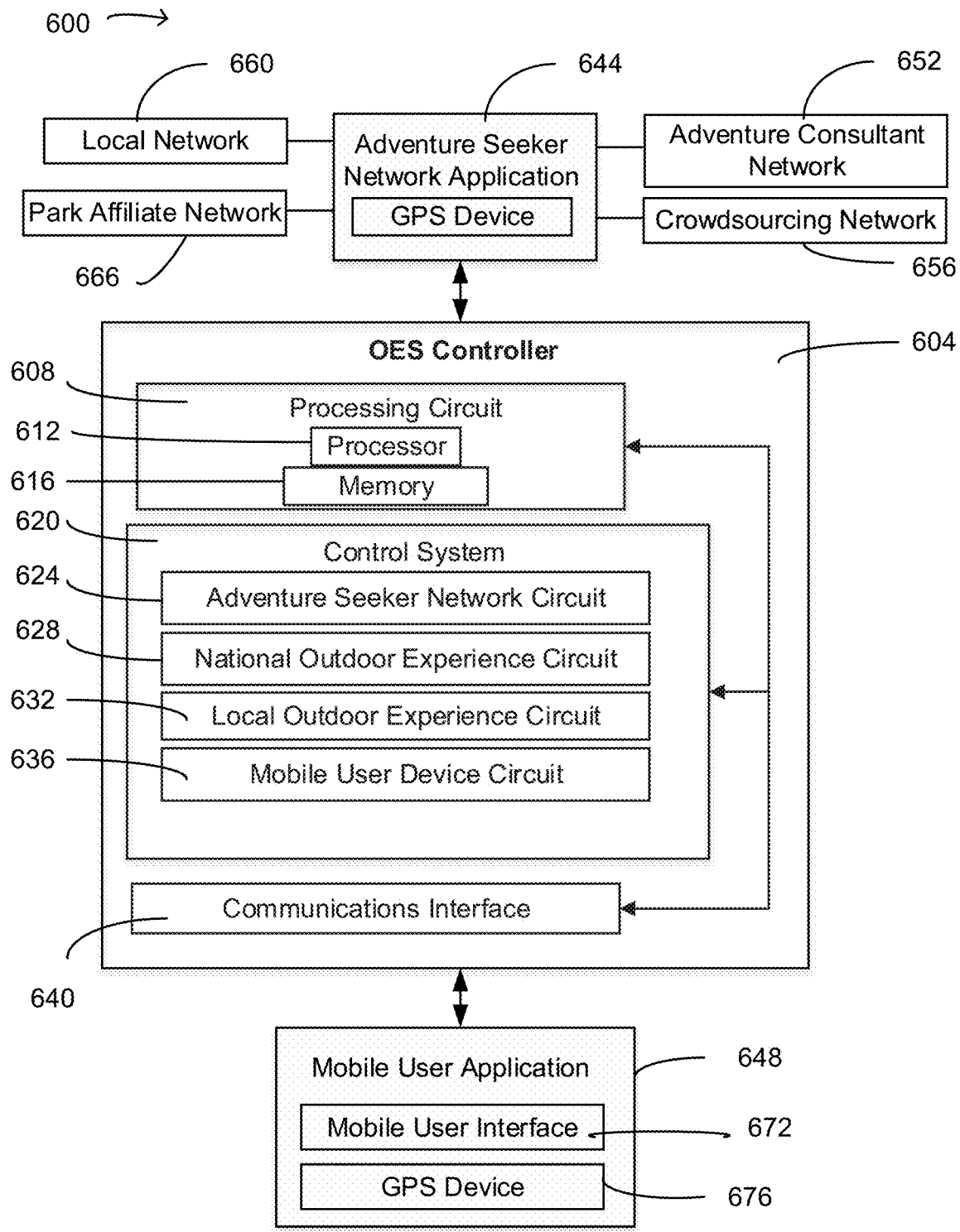
FIG. 6 is a schematic view of an outdoor experience controller of the outdoor experience system of FIG. 1, according to an exemplary embodiment.

As shown in FIG. 6, a schematic diagram of an outdoor experience system (OES) 600 is shown, according to an exemplary embodiment. The OES 600 may be an exemplary embodiment of the OES 50 shown in FIG. 1. An OES controller 604 includes a processing circuit 608, having a processor 612 and a memory 616, a control system 620 having an adventure seeker network circuit 624, a national outdoor experience circuit 628, a local outdoor experience circuit 632, and a mobile user device circuit 636, and a communications interface 640. The OES controller 604 is structured to communicate with other applications or devices (e.g., an adventure seeker network application 644, a mobile user application 648, etc.) via the communications interface 640.

Referring to FIG. 6 generally, in some embodiments the OES controller 604 is implemented within a single computer (e.g., one server, one housing, etc.). In other embodiments the OES controller 604 is distributed across multiple servers or computers (e.g., that can exist in distributed locations). Further, while FIG. 6 shows external applications (e.g., the adventure seeker network application 644 and the mobile user application 648) outside of the OES controller 604, in some embodiments, external applications are hosted within the OES controller 604 (e.g., within the memory 616).

As shown in FIG. 6, the OES controller 604 is shown to include the processing circuit 608, including the processor 612 and the memory 616. The processing circuit 608 may be structured or configured to execute or implement the instructions, commands, and/or control processes described herein with respect to the control system 620. FIG. 6 shows a configuration that represents an arrangement where the control system 620 is embodied as a machine or computer readable media, as described below. However, FIG. 6 is not meant to be limiting as the present disclosure contemplates other embodiments, such as where the control system 620, or at least one circuit of the control system 620, is configured as a hardware unit. All such combinations and variations are intended to fall within the scope of the present disclosure.

The processor 612 may be implemented or performed with a general purpose single- or multi-chip processor, a digital signal processor (DSP), an application specific integrated circuit (ASIC), one or more field programmable gate array (FPGAs), or other suitable electronic processing components. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors are shared by multiple circuits (e.g., the circuits of the control system 620 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors are coupled via a bus to enable independent, parallel, pipelined, or multi-threaded instruction execution. All such variations are intended to fall within the scope of the present disclosure.

The memory 616 (e.g., memory, memory unit, storage device, etc.) may include one or more devices (e.g., RAM, ROM, Flash memory, hard disk storage, etc.) for storing data and/or computer code for completing or facilitating the processes, layers and modules described in the present application. The memory 616 may be or include tangible, non-transient volatile memory or non-volatile memory. The memory 616 may also include database components, object code components, script components, or any other type of information structure for supporting the activities and information structures described in the present application. According to an exemplary embodiment, the memory 616 is communicably connected to the processor 612 via the processing circuit 608 and includes computer code for executing (e.g., by the processing circuit 608 and/or the processor 612) one or more processes described herein.

As shown in FIG. 6, the OES controller 604 includes a control system 620. In an exemplary configuration, the control system 620 is embodied as machine or computer-readable media that is executable by a processor, such as the processor 612. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 620 is embodied as hardware units, such as electronic control units. As such, the control system 620 may be embodied as one or more circuitry components including, but not limited to, processing circuitry, network interfaces, peripheral devices, input devices, output devices, sensors, etc. In some embodiments, the control system 620 takes the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 620 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 620 may also include programmable hardware devices such as field programmable gate arrays, programmable array logic, programmable logic devices or the like. The control system 620 may include one or more memory devices for storing instructions that are executable by the processor(s) of the control system 620. The one or more memory devices and processor(s) may have the same definition as provided above with respect to the memory 616 and the processor 612. In some hardware unit configurations, the control system 620 is geographically dispersed throughout separate locations. Alternatively and as shown, the control system 620 may be embodied in or within a single unit/housing, which is shown as the OES controller 604.

As shown in FIG. 6, the OES controller 604 also includes a communications interface 640. The communications interface 640 may be structured to provide and enable communications between and among the processing circuit 608, the control system 620, and external applications (e.g., the adventure seeker network application 644, the mobile user application 648, etc.).

In some embodiments, the adventure seeker network circuit 624 is structured to communicate with the adventure seeker network application 644 via the communications interface 640. The adventure seeker network circuit 624 may be structured to receive all guide data from the adventure seeker network application 644, as discussed below. In an exemplary embodiment, guide data includes information relating to the user's current location, routes and distances to certain locations (e.g., a parking lot, the starting location 508, etc.), the outdoor experience location 500, the route 502, the map 504, the instructions 506, and all other information relating to the outdoor experience 100 (i.e., all data associated with the outdoor experience 100). The adventure seeker network circuit 624 may use the guide data to determine the outdoor experience 100, as well as, the route 502, the map 504, the instructions 506, and other suitable information associated with the outdoor experience 100. In some embodiments, the adventure seeker network circuit 624 receives the guide data and determines the most visited outdoor experience, the highest ranked, the experience with the most difficult route, the longest route, and/or other characteristics that may be desirable in selecting the outdoor experience 100. The adventure seeker network circuit 624 may also communicate with the circuits of the control system 620 (e.g., the national outdoor experience circuit 628, the local outdoor experience circuit 632, and the mobile user device circuit 636). In some embodiments, the adventure seeker network circuit 624 also communicates with the memory 616 to store guide data and other data associated with the outdoor experience 100.

In an exemplary embodiments, the national outdoor experience circuit 628 is also structured to communicate with the adventure seeker network application 644 via the communications interface 640. The national outdoor experience circuit 628 may be structured to receive national guide data from the adventure seeker network application 644, as discussed below (e.g., the adventure consultant network 652, the crowdsourcing network 656, etc.). In some embodiments, the national outdoor experience circuit 628 also receives guide data from the adventure seeker network circuit 624 and determines the outdoor experience 100 nationally (e.g., nationally the most visited, the most difficult, etc.). The national outdoor experience circuit 628 may also determine the outdoor experience location 500, the route 502, the map 504, instructions 506, etc. associated with the outdoor experience 100. In some embodiments, the national outdoor experience circuit 628 also communicates with the memory 616 to store the guide data, as well as, other data associated with the outdoor experience 100.

In an exemplary embodiment, the local outdoor experience circuit 632 is structured to communicate with the adventure seeker network application 644 via the communications interface 640. The local outdoor experience circuit 632 may be structured to receive local guide data from the adventure seeker network application 644, as discussed below (e.g., the local network 660, the park affiliate network 666, etc.). The local outdoor experience circuit 632 may also receive guide data from the adventure seeker network circuit 624 and determine the outdoor experience 100 locally (e.g., locally the most visited, the most difficult, etc.). The local outdoor experience circuit 632 may also determine the outdoor experience location 500, the route 502, the map 504, the instructions 506, etc. associated with the outdoor experience 100. In some embodiments, the local outdoor experience circuit 632 also communicates with the memory 616 to store guide data and other data associated with the outdoor experience 100.

In an exemplary embodiment, the mobile user device circuit 636 is structured to communicate with the mobile user application 648 via the communications interface 640. The mobile user device circuit 636 may be structured to receive the guide data (e.g., the outdoor experience location 500 data, the route 502 data, the map 504 data, the instructions 506 data, etc.), and any other data associated with the outdoor experience 100, from the adventure seeker network circuit 624, the national outdoor experience circuit 628, the local outdoor experience circuit 632, and/or the memory 616. The mobile user device circuit 636 may communicate with the mobile user application 648, and relay guide data received from the other circuits in the control system 620 to the mobile user application 648. In some embodiments, the mobile user device circuit 636 also receives input data (e.g., GPS data, route data, etc.) from the mobile user application 648 via the communications interface, as discussed below. The mobile user device circuit 636 may also communicate with the circuits of control system 620 (e.g., circuits 624-632) and/or the memory 616 to store guide data and other data associated with the outdoor experience 100.

With continued reference to FIG. 6, the OES controller 604 may be configured to communicate with other applications, specifically the adventure seeker network application 644. In an exemplary embodiment, the adventure seeker network application 644 is structured to receive guide data, and other data relating to the outdoor experience 100, from various sources. The adventure seeker network application 644 may be configured to accept outdoor experience input (i.e., guide data relating to the outdoor experience 100) from a graphical user interface (GUI), web-based computing device, online website, or any other source for relaying data (e.g., word of mouth, written correspondence, personal experience). For example, the adventure seeker network application 644 may receive guide data from an adventure consultant network 652, a crowdsourcing network 656, a local network 660, a park affiliate network 666, and/or any other suitable network. In some embodiments, the adventure seeker network application 644 compiles, stores, and/or processes guide data from the various sources (e.g., networks 652-66) and/or communicates the guide data with the circuits of the control system 620 (e.g., circuits 624-632) via the communications interface 640.

For example, the adventure seeker network application 644 may compile guide data from the crowdsourcing network 656 and the adventure consultant network 652, and provide information (e.g., guide data) to the circuits of the control system 620 (e.g., the national outdoor experience circuit 628) for processing within the OES controller 604. In addition, the adventure seeker network application 644 may compile guide data from the local network 660 and the park affiliate network 666 in a specific geographic area, and provide the information (e.g. guide data) of the specific geographic location to the circuits of the control system 620 (e.g., the local outdoor experience circuit 632) for processing. The circuits of the control system 620 (e.g., circuits 624-632) may communicate the guide data associated with the outdoor experience 100 to the mobile user device circuit 636, which may communicate the guide data with the mobile user application 648, as discussed below.

The OES controller 604 is also configured to communicate with the mobile user application 648. The mobile user application 648 receives guide data relating to the outdoor experience 100 from the mobile user device circuit 636 via the communications interface 640. The mobile user application 648 may display the guide data associated with the outdoor experience 100 (e.g., the outdoor experience location 500 data, the route 502 data, the map 504 data, the instructions 506 data, distances data, difficulty data, etc.) via a mobile user interface 672. In some embodiments, the mobile user application 648 may be controlled by the OES controller 604 to display guide data relating to the outdoor experience 100 via the mobile user interface 672.

In some embodiments, the mobile user application 648 is used to load guide data of the outdoor experience 100. For example, the mobile user application 648 may be used to scan the charm 108 and process the geolocator 306 information. The mobile user application 648 may communicate the charm 108 data (e.g., the geolocator 306 information and other guide data) with the mobile user device circuit 636 via the communications interface 640. Based on the information from the charm 108 (e.g., the geolocator 306 information and other guide data), the circuits of the control system 620 (e.g., circuits 624-632) may load the guide data of the outdoor experience 100 that is associated with the charm 108 (e.g., the geolocator 306 information). This guide data (e.g., the map 504 data, the route 502 data, the instructions 506 data, etc.) can be stored in the memory 616 and/or processed by the circuits of the control system 620. The information can also be processed by the mobile user device circuit 636, and communicated with the mobile user application 648 via the communications interface 640. The guide data associated with the outdoor experience 100 can be displayed on the mobile user application 648 via the mobile user interface 672. In some embodiments, the geolocator 306 information is not provided by the charm 108; rather, the geolocator 306 information is gathered in the mobile user application 648 via a message, notification, ping, or any other suitable notification.

In some embodiments, the mobile user application 648 also includes a GPS device 676. The GPS device 676 may determine the current location of the mobile user application 648, and the mobile user application 648 may communicate the current location to the mobile user device circuit 636 via the communications interface 640. Based on the current location of the mobile user application 648, the circuits of the control system 620 (e.g., circuits 624-632) may determine the outdoor experience 100, or a plurality of outdoor experiences 100, that is/are within a predetermined distance (e.g., 1 mile, 5 miles, 10 miles, etc.) from the current location of the mobile user application 648. The predetermined distance may be determined by a preset, user input, other user recommendations, etc.

In response to determining the outdoor experience 100, or plurality of outdoor experiences 100, is/are within the predetermined distance from the current location of the mobile user application 648, the mobile user device circuit 636 may receive guide data of (a plurality of) outdoor experience(s) 100 from the circuits of the control system 620 (e.g., circuits 624-632) and/or the memory 616. The mobile user device circuit 636 may communicate the guide data to the mobile user application 648 via the communications interface 640, and the mobile user interface 672 may display the guide data (e.g., the route 502 data, the map 504 data, the instructions 506 data, distances data, difficulty data, etc.) to the end user. In some embodiments, the end user interacts with the mobile user interface 672 regarding the outdoor experience 100, as discussed below.

Utilizing the OES controller 604, the mobile user application 648 may be used to provide the end user with the outdoor experience 100. In other words, the OES 600 may be used to provide the end user with the outdoor experience 100 based on information and data attained from various local and/or national resources.

Figure 7:
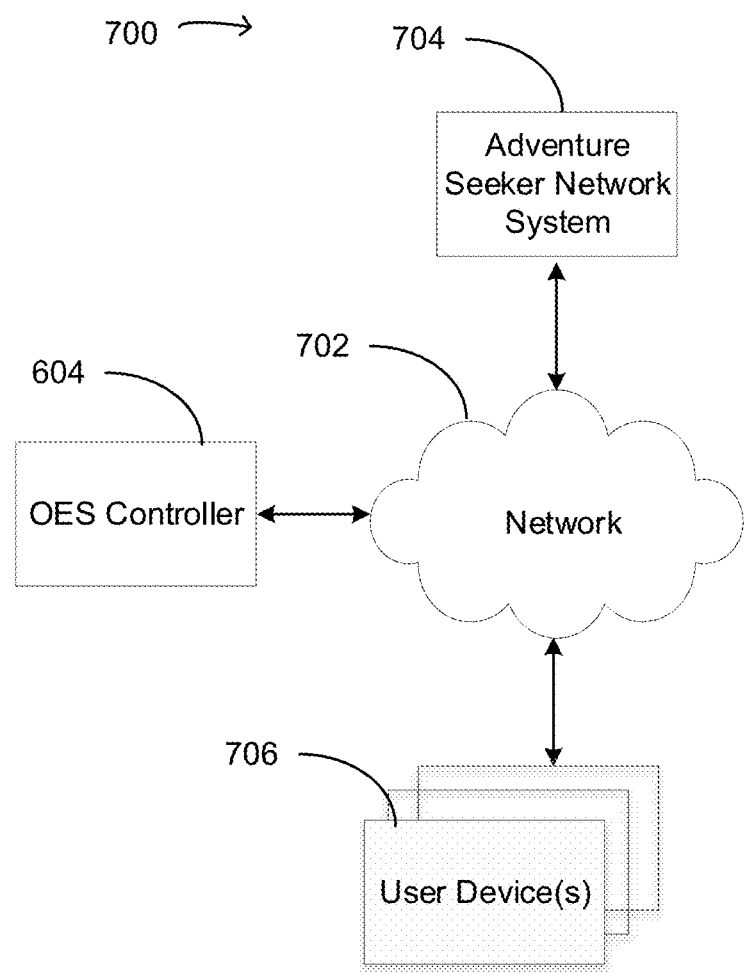
FIG. 7 is a schematic view of the outdoor experience controller of FIG. 6, according to an exemplary embodiment.

As shown in FIG. 7, a schematic diagram of an OES 700 is shown, according to another exemplary embodiment. The OES 700 may be an exemplary embodiment of the OES 50 shown in FIG. 1, or the OES 600 shown in FIG. 6. As described briefly above, the OES 700 may encompass any number of systems, subsystems, and devices that can be incorporated with the outdoor experience 100, thereby providing the end user with the outdoor experience 100. As shown in FIG. 7, in some embodiments the OES 700 includes a network 702, the OES controller 604, an adventure seeker network system 704, and user device(s) 706.

The network 702 may be a communications network (e.g., a WAN, the Internet, a cellular network, etc.) and/or any suitable wired or wireless network. The OES controller 604, the adventure seeker network system 704, and/or the user device(s) 706 may be configured to receive and transmit data via the network 702.

As shown in FIG. 7, the OES 700 also includes the adventure seeker network system 704 (e.g., a server). The adventure seeker network system 704 may be any suitable computing device or system, for example a server, a desktop or laptop computer, a remote system (e.g., cloud server), central computing system, etc. In one embodiment, the adventure seeker network system 704 is configured to receive, process, store, and/or transmit guide data or signals to/from various components of the OES 700. For example, the adventure seeker network system 704 may be configured to receive and transmit guide data (e.g., the route 502 data, the map 504 data, the instructions 506 data, distances data, difficulty data, etc.) relating to the outdoor experience 100 via the network 702. In some embodiments, the adventure seeker network system 704 communicates (e.g., receives and transmits guide data to/from) with the OES controller 604, as discussed above with regard to FIG. 6 (e.g., similar to communication between the adventure seeker network application 644 and the OES controller 604). In this regard, the adventure seeker network system 704 may receive guide data relating to the outdoor experience 100, or a plurality of outdoor experiences, and/or transmit signals to the OES controller 604 to provide guide data relating to the outdoor experience 100.

As shown in FIG. 7, the OES 700 also include user device(s) 706, which may host the mobile user application 648. Each of the user device(s) 706 may be a computing device including a memory (e.g., RAM, ROM, Flash memory, hard disk storage, etc.), a processor (e.g., a general purpose processor, an application specific integrated circuit (ASIC), one or more field programmable gate arrays (FPGAs), a group of processing components, or other suitable electronic processing components), and a user interface (e.g., a touch screen), allowing a user to interact with the OES 700 and/or the mobile user application 648. The user device(s) 706 may include, for example mobile phones, electronic tablets, laptops, desktop computers, workstations, and other types of electronic devices. More generally, the user device(s) 706 may include any electronic device that allows a user to interact with the OES 700 (e.g., through a user interface). In some embodiments, the user device(s) 706 is connected to the network 702 via an intranet or via the Internet, either via a wired connection or a wireless connection. In other embodiments, the user device(s) 706 is used to communicate (e.g., receive and transmit guide data to/from) with the OES controller 604 as discussed with regard to FIG. 6 (e.g., similar to communication between the mobile user application 648 and the OES controller 604). For example, the end user may interact with the user device 706 (and communicate with the OES controller 604) to view a desired outdoor experience 100, find a new outdoor experience 100, load a new outdoor experience 100 using the geolocator 306 information on the charm 108, submit a new outdoor experience, and/or view guide data (e.g., the route 502 data, the instructions 506 data, distances data, difficulty data, time data, etc.) relating to the outdoor experience 100.

Referring generally to FIGS. 8-11, example interfaces for providing the outdoor experience 100 are shown, according to some embodiments. The example interfaces in FIGS. 8-11 may be generated and/or displayed by a user device (e.g., the user device 706), which may include an outdoor experience application or a similar application associated with the outdoor experience 100. As shown, these interfaces may be displayed on a user interface of the user device 706, such that a user may interact with the interfaces by entering information, scrolling, resizing, or otherwise manipulating various graphical elements (e.g., icons, buttons, badges, maps, etc.). It will be appreciated that the interfaces shown in FIGS. 8-11, and various other interfaces described herein, are examples of interfaces that can be generated and presented by the user device 706, but the particular design or layout of these interfaces is not intended to be limiting.

Figure 8:
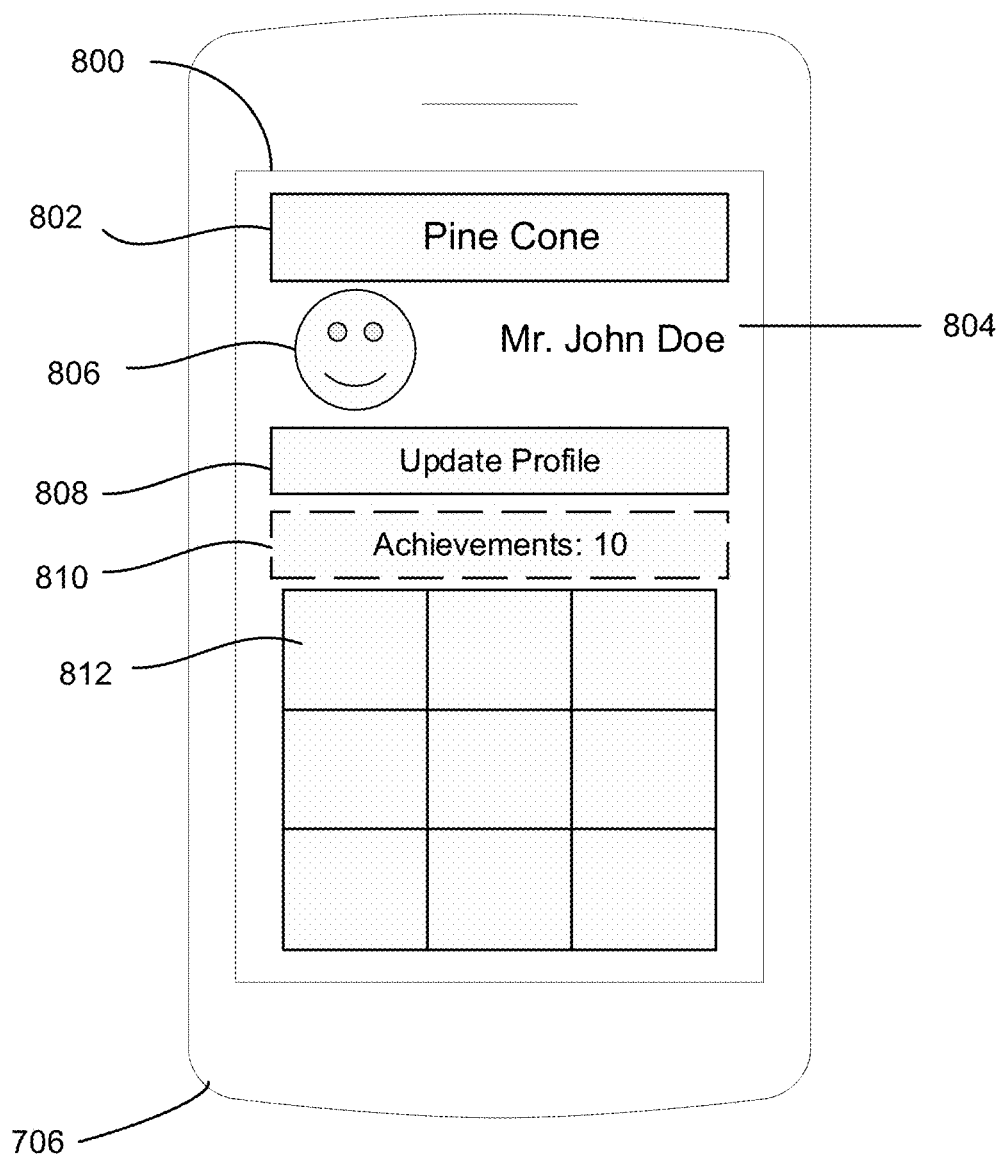
FIG. 8 is a schematic view of an outdoor experience profile interface of the outdoor experience controller of FIG. 6, according to an exemplary embodiment.

Referring now to FIG. 8, an outdoor experience profile interface 800 is shown, according to an exemplary embodiment. Interface 800 may be presented via a user interface of the user device 706, and may be part of the OES 600 or the OES 700 shown in FIGS. 6-7. In an exemplary embodiment, the interface 800 includes the name of an application 802 developed for outdoor experiences (e.g., "Pine Cone"), and a variety of user information. For example, user information may include a name 804 (e.g., "Mr. John Doe"), age, favorite activities, and/or other personal information (e.g., phone number, email address, etc.). As shown in FIG. 8, the interface 800 also includes a profile picture 806, which may be a picture of the user, the outdoor experience 100, or any other suitable picture. In some embodiments, the interface 800 includes an "Update Profile" icon 808, which when selected causes the user device 706 to display a secondary interface (e.g., via a pop-up window) that allows the user to change certain profile information, such as the name 804, personal information, and/or profile picture 806.

In some embodiments, the outdoor experience profile interface 800 also includes an achievements 810. The achievements 810 may include the number of achievements the user has obtained, the achievement level of the user, and/or the number of achievements needed to be provided a prize, as discussed below. The interface 800 may also include a picture collage 812. The picture collage 812 may include pictures of the user at various outdoor experiences 100, or pictures relating generally to the outdoor experience 100. As discussed above, the user may display in the picture collage 812 pictures of the user at the outdoor experience 100 (e.g., at the outdoor experience location 500), the user with the charm bracelet 102, a new outdoor experience location 500, or proposed new outdoor experience 100, etc.

Figure 9:
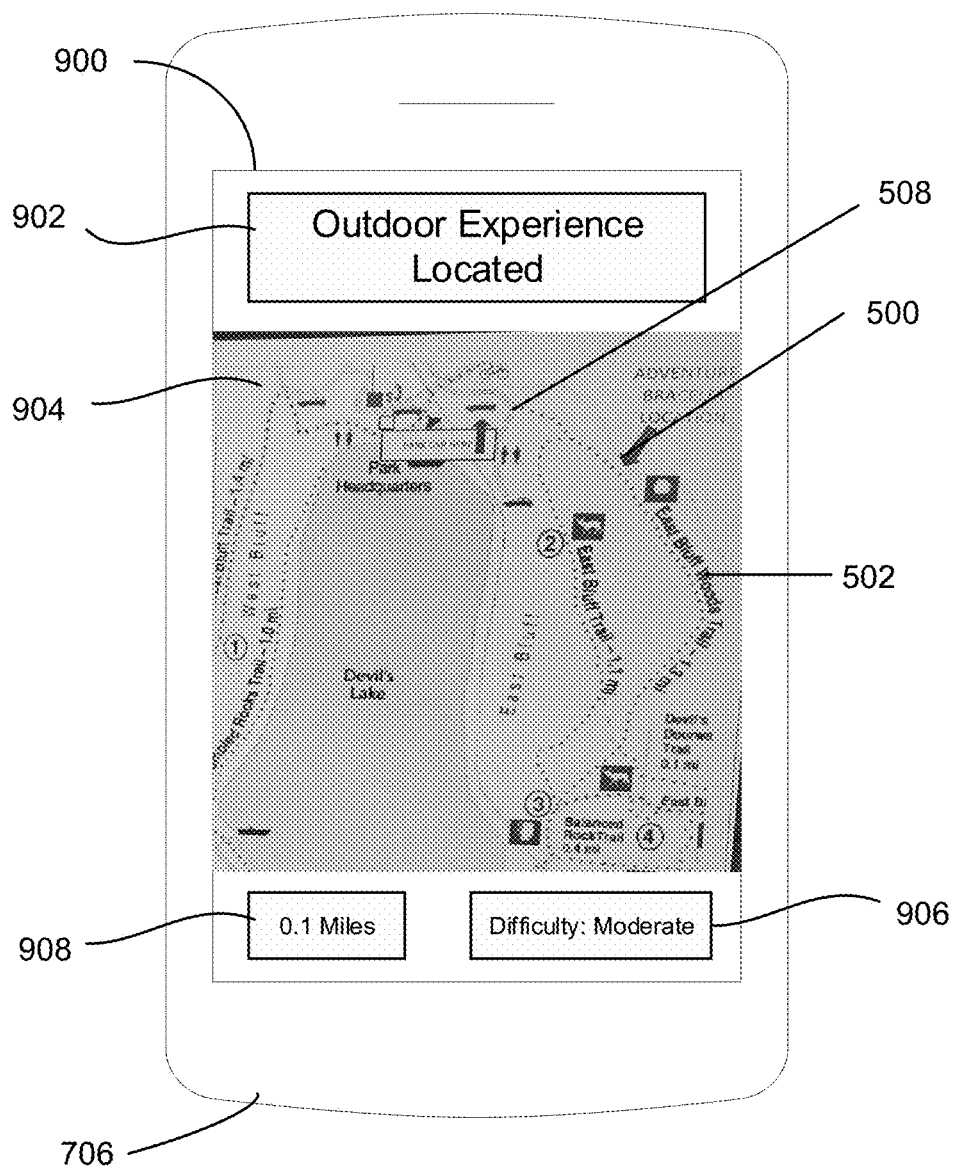
FIG. 9 is a schematic view of an outdoor experience locator interface of the outdoor experience controller of FIG. 6, according to an exemplary embodiment.

As shown in FIG. 9, an outdoor experience locator interface 900 is shown, according to an exemplary embodiment. The interface 900 may be presented via a user interface of the user device 706, may be an exemplary embodiment of the guide 104 as shown in FIGS. 4-5, and may be part of the OES 600 or the OES 700 shown in FIGS. 6-7. In an exemplary embodiment, the interface 900 includes a locator icon 902, a locator map 904, an outdoor experience difficulty 906, and a locator distance 908. In some embodiments, the locator icon 902 is displayed as a banner or badge, and is accompanied by a ding or alarm, and/or with any other notification suitable for notifying the user that the outdoor experience 100 has been located. The locator icon 902 may be displayed in response to a request from the user, in response to determining the user's current geographic location is within a predetermined distance from the outdoor experience location 500 (as discussed above), and/or in response to another user loading the outdoor experience 100 into the user's mobile user application 648 (e.g., a friend gifting the outdoor experience 100 to another friend). As shown in FIG. 9, the interface 900 also includes a locator map 904 that displays the outdoor experience location 500 and other information relating to the outdoor experience 100. In some embodiments, the locator map 904 is an exemplary embodiment of the map 504 shown in FIGS. 4-5.

For example, the locator map 904 may include the user's current geographic location, the outdoor experience location 500, the starting location 508, the route 502, and other landmarks associated with the outdoor experience 100 (e.g., a parking lot, other routes to use, other sites to visit, etc.).

As shown in FIG. 9, the interface 900 also includes an outdoor experience difficulty 906, and a locator distance 908. The outdoor experience difficulty 906 may indicate the difficulty level of the outdoor experience 100. In some embodiments, the outdoor experience difficulty 906 may be selected, which causes the user device 706 to display a secondary interface (e.g., via a pop-up window) that allows the user to see other information (e.g., guide data) relating to the outdoor experience 100 (e.g., distance, elevation, time to complete, etc.). As shown in FIG. 9, the interface 900 also includes a locator distance 908, which indicates the distance from the user's current geographic location to the starting location 508 of the route 502 (or routes) associated with the outdoor experience 100.

In some embodiments, the locator map 904 includes a highlighted route for the user to follow to reach the starting location 508 of the route 502 (or routes) associated with the outdoor experience 100, and/or includes turn-by-turn directions (or an upcoming turn direction). In an exemplary embodiment, the user device 706 continuously updates and/or determines the user's current geographic location, which is utilized to update the interface 900 while the user is traveling to the starting location 508 of the route 502 (e.g., parking lot) and/or traveling to the outdoor experience location 500, as discussed below. In some embodiments, the outdoor experience locator interface 900 is generated from the OES controller 604, the adventure seeker network system 704, the user device 706, the adventure seeker network application 644, and/or the mobile user application 648. In other embodiments, the interface 900 communicates with a third-party service for generating the interface 900. For example, the interface 900 may communicate with a navigation search service such as Google Maps®.

In some embodiments, the navigation features are integrated into a multimedia system or a control system for a vehicle. In some embodiments, the adventure seeker network system 704 (and/or the OES controller 604 or the user device 706) generates and transmits user interfaces and/or navigation data to the multimedia system, for display on a user interface within the vehicle (e.g., a vehicle dashboard running Apple CarPlay®). In some embodiments, an autonomous or semi-autonomous vehicle receives navigation data from the adventure seeker network system 704 (and/or the OES controller 604 or the user device 706), and automatically navigates to the target location.

Figure 10:
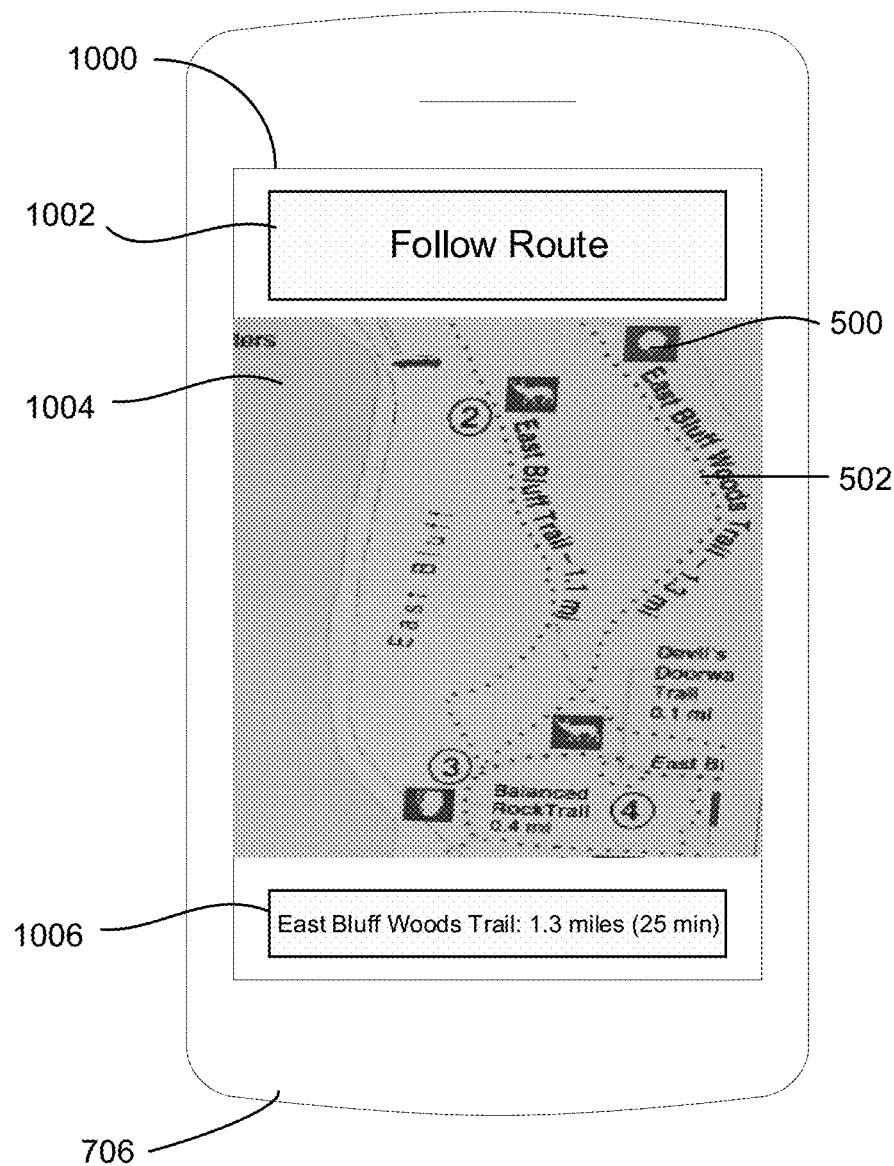
FIG. 10 is a schematic view of an outdoor experience navigation interface of the outdoor experience controller of FIG. 6, according to an exemplary embodiment.

As shown in FIG. 10, an outdoor experience navigation interface 1000 is shown, according to an exemplary embodiment. The interface 1000 may be presented via a user interface of the user device 706, may be an exemplary embodiment of the guide 104 as shown in FIGS. 4-5, and may be part of the OES 600 or the OES 700 shown in FIGS. 6-7. In an exemplary embodiment, the interface 1000 includes a navigation icon 1002, a navigation map 1004, and a navigation distance 1006. In some embodiments, the navigation icon 1002 is displayed as a banner or badge, and includes voice instructions, and/or with any other notification suitable for providing the user the outdoor experience 100. In some embodiments, the navigation map 1004 is an exemplary embodiment of the map 504 shown in FIGS. 4-5. For example, the navigation map 1004 may display the user's current geographic location, the starting location 508, the route 502, the outdoor experience location 500, and other information associated with the outdoor experience 100 (e.g., a parking lot, other routes to use, other sites to visit, restrooms, etc.). As discussed above, the navigation map 1004 of the interface 1000 may also include a highlighted route for the user, turn-by-turn directions, be updated in real time, be generated using a third-party service, etc.

In some embodiments, the outdoor experience navigation interface 1000 also includes a navigation distance 1006. The navigation distance 1006 may indicate the name of the outdoor experience 100 (e.g., "East Bluff Woods Trail") and/or the distance from the user's current geographic location to the outdoor experience location 500. In some embodiments, the navigation distance 1006 may be selected, and the user device 706 displays a secondary interface (as discussed above) with other information relating to the outdoor experience 100 (e.g., elevation, steps, calories burned, etc.).

Figure 11:
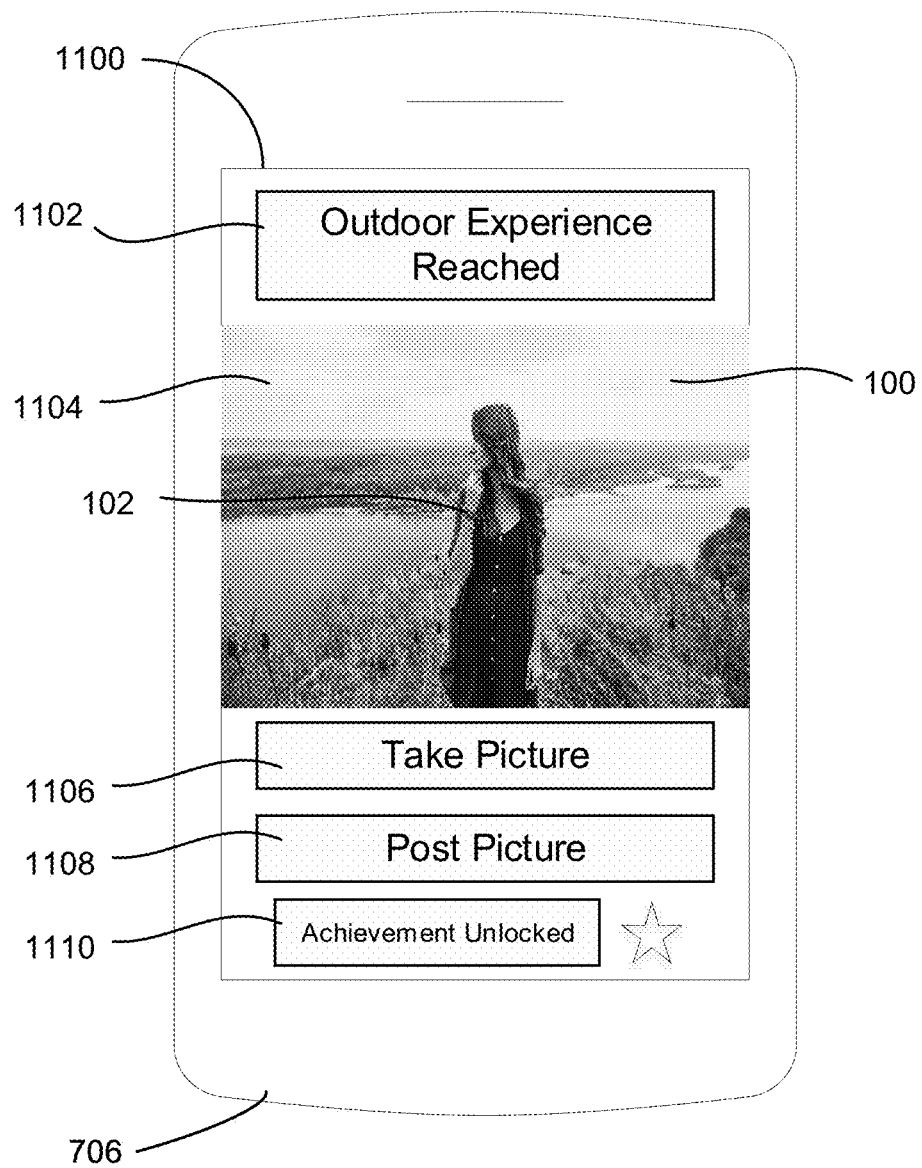
FIG. 11 is a schematic view of an outdoor experience interface of the outdoor experience controller of FIG. 6, according to an exemplary embodiment.

As shown in FIG. 11, an outdoor experience interface 1100 is shown, according to an exemplary embodiment. The interface 1100 may be presented via a user interface of the user device 706, and may be part of the OES 600 or the OES 700 shown in FIGS. 6-7. In an exemplary embodiment, the interface 1100 includes an outdoor experience icon 1102, an outdoor experience picture 1104, a set of instruction icons (e.g., take picture icon 1106 and post picture icon 1108), and an achievement icon 1110. As shown in FIG. 11, the outdoor experience icon 1102 indicates that an end user is near the outdoor experience location 500 (e.g., "Outdoor Experience Reached"). The outdoor experience icon 1102 may indicate the end user has reached the outdoor experience location 500 when the user is within a predetermined distance from the outdoor experience location 500 (e.g., based on a preset, user preference, other user recommendations, etc.). In some embodiments, the icon 1102 is a banner or badge, and is accompanied by a ding or alarm, and/or any other notification suitable for notifying a user that the user has reached the outdoor experience location 500.

As shown in FIG. 11, the interface 1100 also includes an outdoor experience picture 1104 and a set of instruction icons. Similar to the instructions 506 discussed above in regard to FIGS. 4-5, the interface 1100 may also include a set of instruction icons, for example instructions to take a picture of the outdoor experience 100 at the outdoor experience location 500 (e.g., take picture icon 1106) and/or to share the picture (e.g., post picture icon 1108). The user may take an outdoor experience picture 1104 at the outdoor experience location 500 (e.g., as instructed by take picture icon 1106), and may share the outdoor experience picture 1104 (e.g., as instructed by post picture icon 1108) on an application 802 (e.g., "Pine Cone"), online, or to any other suitable social media platform or public forum. In an exemplary embodiment, the outdoor experience picture 1104 is added to the picture collage 812, or as the profile picture 806, of the user in the outdoor experience profile interface 800 of FIG. 8. Other users may view the outdoor experience picture 1104 on a mobile application, online, or any other suitable social media or public forum, and may preview the outdoor experience 100 through the outdoor experience picture 1104.

In an exemplary embodiment, the set of instruction icons are displayed only on the interface 1100. In other embodiments, icons 1106 and 1108 are displayed on the outdoor experience profile interface 800 of FIG. 8, the outdoor experience navigation interface 1000 of FIG. 10, or any other suitable interfaces, in audio or visual formats. In some embodiments, the interface 1100 also includes instructions to take a picture of the outdoor experience 100 at the outdoor experience location 500 with the charm bracelet 102 in the picture, with others in the picture, with only the outdoor experience 100 in the picture, etc.

As shown in FIG. 11, in an exemplary embodiment, taking a picture of the outdoor experience 100 with the charm bracelet 102 in the picture (i.e., in outdoor experience picture 1104) results in an achievement icon 1110 being displayed (e.g., "Achievement Unlocked"). In some embodiments, the achievement icon 1110 is displayed when the user reaches the outdoor experience location 500. In other embodiments, the achievement icon 1110 is displayed when the user posts the outdoor experience picture 1104 (with the charm bracelet 102) to the application 802 (e.g., "Pine Cone"), online, or any other suitable social media platform or public forum. In yet other embodiments, the achievement icon 1110 is displayed when the users posts the outdoor experience picture 1104 (e.g., with or without the charm bracelet 102), and other users interact with the outdoor experience picture (e.g., a predetermined number of other users view, like, give a "thumbs up," save, etc. the outdoor experience picture 1104). In some embodiments, the interface 1100 notifies the user an achievement has been unlocked by displaying a banner or badge, including a ding or chime, and/or with any other notification suitable for notifying the user an achievement has been unlocked. As mentioned briefly above, when an achievement is unlocked the achievements 810 is updated and displayed on the outdoor experience profile interface 800. In other embodiments, the interface 1100 displays the total number of achievements a user has achieved, displays the number of achievements needed for a prize, and/or displays how many more achievements the user needs to be provided a prize. The interface 1100 may also display the type of prize, and instructions for how the user may claim the prize, etc. In yet other embodiments, no achievements are needed to receive a prize, and the user is provided a prize for reaching the outdoor experience location 500 (e.g., when the outdoor experience icon 1102 is displayed).

In some embodiments, the features of the outdoor experience system (e.g., OES 50, OES 600, and/or OES 700) are provided in a kit. For example, in some embodiments the kit includes the charm bracelet 102 (e.g., the charm 108 and the string 110) and the guide 104. The kit may be packaged in a bag, a box, or any other suitable container. The kit may be ordered by an end user and shipped in the bag, box, or container, or may be ordered by a third-party (e.g., a member of the adventure consultant network 652, a friend, etc.) and shipped to the end user, e.g., as a gift. In some embodiments, the kit also includes the application 802. The kit may include instructions for downloading the application 802, a purchase order or code for accessing the application 802, and/or immediate access to the application 802. In some embodiments, the kit also includes additional instructions (e.g., an instruction manual) and/or a message relating to the outdoor experience system.

Figure 12:
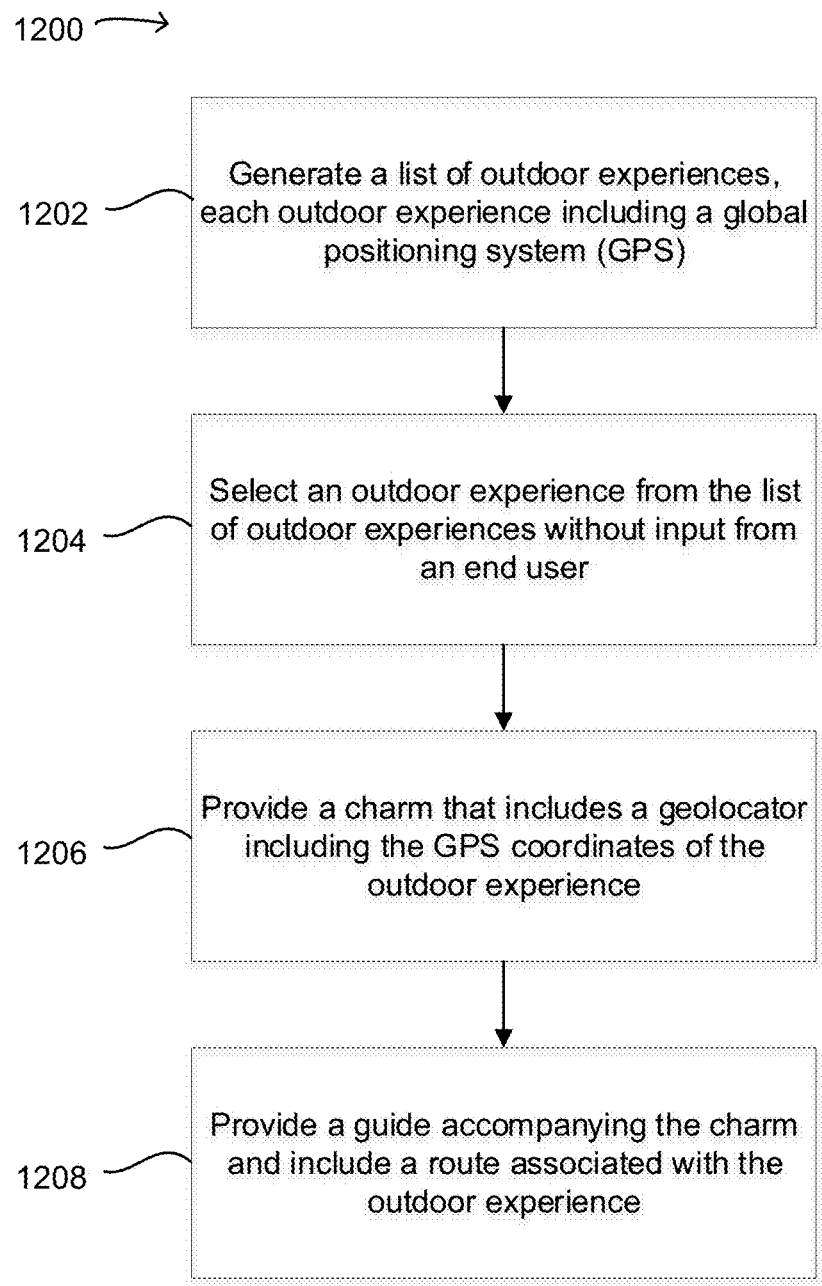
FIG. 12 is a flowchart of a process for providing an outdoor experience, according to an exemplary embodiment.

As shown in FIG. 12, a flowchart of a process 1200 for providing an outdoor experience is shown, according to an exemplary embodiment. The process 1200 can be executed using the charm bracelet 102 and the guide 104, and the OES 50 of FIG. 1. In some embodiments, the process 1200 is executed using the OES controller 604, the adventure seeker network application 644, and/or the mobile user application 648 of FIG. 6, and the OES 600 of FIG. 6. In some embodiments, the process 1200 is executed using the OES controller 604, the network 702, the adventure seeker network system 704 and/or the user device 706 of FIG. 7, and the OES 700 of FIG. 7. For exemplary purposes only, the process 1200 is described herein using OES 600 and related features with the understanding that other combinations and/or features described above may be employed or executed as discussed.

At step 1202, the OES 600 generates a list of outdoor experiences, for example a list of outdoor experiences including global positon system (GPS) coordinates for each outdoor experience. In some embodiments, the list of outdoor experiences is provided by the local network 660, the park affiliate network 666, a personal network, etc. The list of outdoor experiences, including the GPS coordinates for each, may be collected by word of mouth, written letters, electronic communication, internet searches, etc. The list may be compiled, stored, processed, and generated in writing or in a digital format, and may be saved locally or externally, in any suitable format.

In some embodiments, the OES 600 generates the list of outdoor experiences as provided by various digital sources, for example the crowdsourcing network 656, the adventure consultant network 652, online websites, online poles or blogs, electronic streaming or posting services, etc. In some embodiments, the list of outdoor experiences are also processed according to certain characteristics (e.g., most visited, highest ranked among the crowdsourcing network 656, most recommended among the adventure consultant network 652, etc.). The list of outdoor experiences may be collected, with or without input from online users, and the list may be compiled, stored, and generated in a digital format. The list may also be saved locally or externally, in any suitable format. In some embodiments, the OES 600 generates the list of outdoor experiences based on predetermined variables or characteristics (e.g., most popular according to a crowdsourcing platform, most visited over the last five years, most difficult within 50 miles of a current geographic location, etc.).

At step 1204, the OES 600 selects an outdoor experience from the list of outdoor experiences, for example the outdoor experience may be selected without input from an end user. In some embodiments, the outdoor experience 100 is selected by a friend, acquaintance, or other person. The outdoor experience 100 may also be selected by a party that provides the outdoor experience 100 and the GPS coordinates to the user (e.g., a member of the adventure consultant network 652, the local network 660, the park affiliate network 666, a personal network, etc.).

In some embodiments, the OES 600 selects the outdoor experience 100 without user input, for example based on user data (e.g., a user's current location, past experiences, friends or colleagues, etc.). The OES 600 may also select the outdoor experience 100 randomly, based on algorithmic or statistical analysis, other user's preferences or recommendations, popular voting, outdoor experiences that are most visited, etc. In other embodiments, the outdoor experience 100 is selected with input from the end user (e.g., user input regarding difficulty, duration, distance, elevation, etc.).

At step 1206, a charm 108 is provided to the user, for example the charm 108 is purchased as part of a kit and provided to the user. In some embodiments, the charm 108 and/or kit is/are gifted to the end user as a gesture from a friend, acquaintance, colleague, or any other suitable person or entity associated with the OES 600. The charm 108 may include the geolocator 306 relating to the outdoor experience 100, and the geolocator 306 may be the GPS coordinates of the outdoor experience location 500, or any other geographical information relating to outdoor experience 100 (e.g., a RFID, a barcode, etc.).

In some embodiments, the charm 108 is not a charm; rather the OES 600 provides a display (e.g., banner, badge, icon, etc.) or alert, via the user device 706, that shows the guide data of the outdoor experience 100 on a graphical user interface (e.g., the interface 900 of FIG. 9). The display on the graphical user interface (e.g., the locator icon 902) may be provided in response to input from a friend, acquaintance, colleague, another user, or any other suitable person or entity. The display may also be provided in response to determining the user's current geographic location is within a predetermined distance from the outdoor experience location 500 as indicated by the geolocator 306, as discussed above.

At step 1208, a guide 104 is provided accompanying the charm. In some embodiments, the guide 104 and the charm 108 are provided as a kit, and the guide 104 and the charm 108 are gifted to the end user as a gesture from a friend, acquaintance, colleague, or any other suitable person or entity associated with the OES 600. In other embodiments, the guide 104 and the charm 108 are purchased by the user. The guide 104 may be printed on card stock, and may include the geolocator 306 relating to the outdoor experience 100, as well as, other guide data (e.g., the route 502, the map 504, and the instructions 506, etc.), as discussed above.

In some embodiments, the guide 104 is not printed; rather, the OES 600 provides the guide 104 as a display via the user device 706. The display may show the outdoor experience location 500 (e.g., using the geolocator 306) relating to the outdoor experience 100 on a graphical user interface (e.g., the interface 1000 of FIG. 10). The graphical user interface of the guide 104 may show the map 504, the route 502, the instructions 506, and other guide data relating to the outdoor experience 100. For example, the map 504 may include the user's current geographic location, the route 502 (which may or may not be highlighted in the map 504), the outdoor experience location 500, and/or other landmarks associated with the outdoor experience 100, as discussed above.

Figure 13:
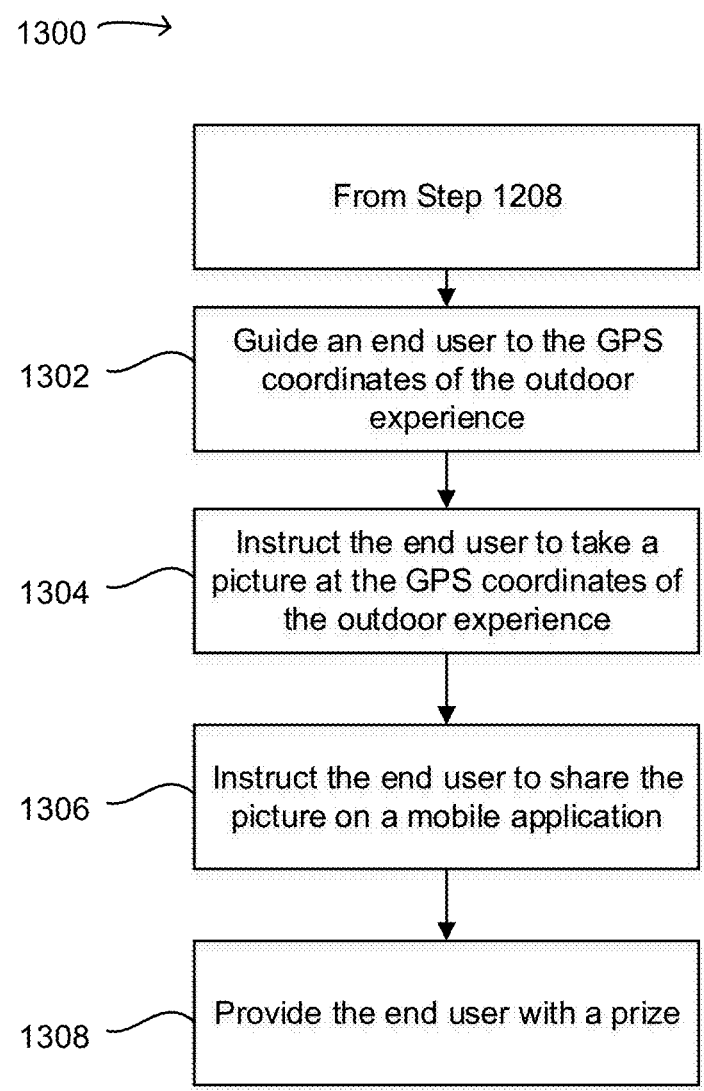
FIG. 13 is another flowchart of a process for providing an outdoor experience, according to an exemplary embodiment.

Referring now to FIG. 13, a process 1300 for providing an outdoor experience may continue from step 1208 of FIG. 12. The process 1300 can be executed using the OES 50 (and corresponding features) of FIG. 1. In some embodiments, the process 1300 is executed using the OES 600 (and corresponding features) of FIG. 6. In some embodiments, the process 1300 is executed using the OES 700 (and corresponding features) of FIG. 7. For exemplary purposes only, process 1300 is described using OES 600 and related features with the understanding that other combinations and/or features described above may be employed or executed as discussed.

At step 1302, the OES 600 guides an end user to the outdoor experience location 500. As discussed above with regard to FIG. 12, the map 504 may include a detailed illustration of the route 502, and the guide 104 may include other guide data relating to the route 502 (e.g., surrounding landscape, difficult or unsafe areas, etc.). In an exemplary embodiment, the instructions 506 include directions for the user to follow to reach the outdoor experience location 500. For example, the instructions 506 may instruct the user to type in the GPS coordinates of the outdoor experience location 500 into a navigational device, follow the route 502 using the guide 104, follow the route 502 using the map 504, etc. In some embodiments, the instructions 506 also include other information relating to the outdoor experience 100, for example historic site information, information on the surrounding nature, etc.

In some embodiments, the OES 600 guides the end user to the outdoor experience location 500 via the guide 104 display, the map 504, the route 502, and the instructions 506 on a graphical user interface (e.g., the interface 1000 of FIG. 10). The graphical user interface may display the map 504 with a depiction of the route 502 (which may or may not be highlighted), the user's current location, the outdoor experience location 500, and/or provide real-time updates of the user's location relative to the route 502, as discussed above. The graphical user interface may also display banners or badges, and/or include voice instructions, that provide turn-by-turn instructions for the user to follow the route 502 (e.g., navigation icon 1002 of FIG. 10). In this regard, the OES 600, via the graphical user interface, may guide the user to the outdoor experience location 500 using (a virtual version of) the map 504 and the route 502, the visual or verbal instructions, or any combination thereof.

At step 1304, the OES 600 instructs the end user to take a picture, for example instructs the end user to take a picture at the outdoor experience location 500. As discussed above, in some embodiments the guide 104 includes instructions 506, which instruct the end user to take a picture of the outdoor experience 100 at the outdoor experience location 500. The instructions 506 may also instruct the end user to take a picture of the outdoor experience 100 with the charm bracelet 102 in the picture, with other people in the picture, without people in the picture, or any combination thereof.

In some embodiments, the OES 600 provides an outdoor experience interface (e.g., picture frame, instructions, notifications, etc.) on a graphical user interface (e.g., the interface 1100 of FIG. 11). The graphical user interface may display a preview of a picture at the outdoor experience location 500 (e.g., the outdoor experience picture 1104 of FIG. 11), and instructions for the user to take a picture (e.g., the take picture icon 1106 of FIG. 11). The graphical user interface may also display instructions for the user to take a picture at the outdoor experience location 500 with or without certain items or things (e.g., the charm bracelet 102, the end user, other users, etc.), as discussed above.

At step 1306, the OES 600 instructs an end user to share a picture, for example instructs the end user to share the picture of the outdoor experience 100 on a mobile application. As discussed above, in some embodiments the guide 104 includes instructions 506. The instructions 506 may instruct the end user to share the picture of outdoor experience 100 on a mobile application (e.g., "Pine Cone," etc.), online, or any other suitable social media platform or public forum.

In some embodiments, the OES 600 instructs the end user to post the picture of the outdoor experience 100 via a graphical user interface (e.g., the interface 1100 of FIG. 11). The graphical user interface may display a picture of the outdoor experience 100 (e.g., the outdoor experience picture 1104 of FIG. 11), and instructions for the user to share the picture of outdoor experience 100 (e.g., the post picture icon 1108 of FIG. 11) to a specific application 802 (e.g., "Pine Cone"). The graphical user interface may also display instructions for the user to share the picture to a different application, online, or to any other suitable social media platform of public forum, as discussed above.

At step 1308, the OES 600 provides an end user with a prize. As discussed above, in some embodiments the guide 104 includes instructions 506, which may also provide messages or information to the end user. The instructions 506 may state that the end user will be provided a prize if the end user takes a picture at the outdoor experience location 500, takes a picture with the charm bracelet 102, posts the picture at the outdoor experience location 500 with the charm bracelet 102 on an application, and/or completes any another suitable act. The instructions may also indicate the way the end user may be provided the prize.

In some embodiments, the OES 600 may also provide a display that shows an outdoor experience interface on a graphical user interface (e.g., the interface 1100 of FIG. 11). The graphical user interface may display the number of achievements the user has achieved, the number of achievements needed to receive a prize, and/or if the user has enough achievements to be provided a prize, as discussed above. For example, the graphical user interface may indicate the number of other users that have interacted with the outdoor experience picture 1104 (e.g., viewed, liked, given a "thumbs up," saved, etc. the outdoor experience picture). In an exemplary embodiment, the graphical user interface indicates the number of interactions needed to receive a prize. The graphical user interface may also display how the end user may be provided or claim the prize. In some embodiments, the graphical user interface may be used to enter or propose a new experience and other users can interact with the proposed experience. Once the proposed experience has received a predetermined number of "likes", the proposed experience may be loaded into the system as an outdoor experience 100. Users can receive prizes or achievements for a proposed experience being accepted as an outdoor experience 100, or for how popular the outdoor experience 100 becomes.

Figure 14:
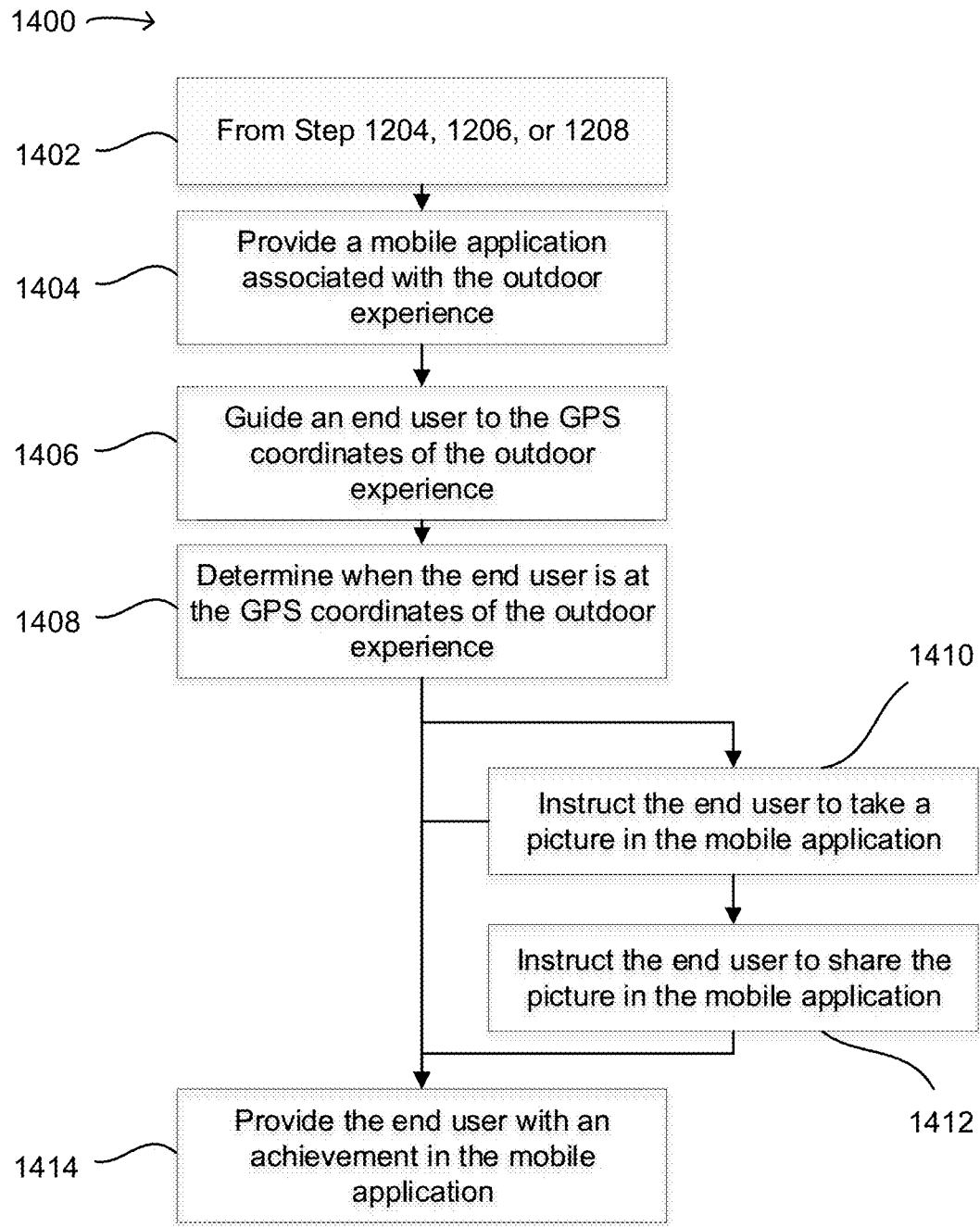
FIG. 14 is yet another flowchart of a process for providing an outdoor experience, according to an exemplary embodiment.

As shown in FIG. 14, a process 1400 for providing the outdoor experience 100 continues from steps 1204, 1206, and/or 1208 of FIG. 12. The process 1400 can be executed using the OES 600 (and corresponding features) of FIG. 6. In some embodiments, the process 1400 is executed using the OES 700 (and corresponding features) of FIG. 7. For exemplary purposes only, process 1400 is described using OES 600 and related features with the understanding that other combinations and/or features described above may be employed or executed as discussed.

At step 1404, the OES 600 provides the end user with the application 802. The application 802 may be an application specifically developed for outdoor experiences (e.g., "Pine Cone"), a generic navigation application, a third-party application, or any other suitable application that provides GPS and navigation information. For exemplary purposes only, the process 1400 is described using the application 802 specifically developed for outdoor experiences. This is not intended to be at all limiting.

In some embodiments, the application 802 (of step 1404) includes outdoor experience specific interfaces, sets of geolocator 306 data, and all other guide data relating to outdoor experience 100 discussed above (e.g., the map 504, the route 502, the instructions 506, etc.). The application 802 may also include lists of outdoor experiences (e.g., from the OES 600), preset algorithms, selection criteria, and/or location information, and/or allow user input via a graphical user interface. The application 802, and the outdoor experience 100 guide data, may be updated in real-time (e.g., from the OES 600). In this regard, the application 802 specifically developed for outdoor experiences may provide that the process 1400 may be a continuation of step 1204 of FIG. 12 (e.g., neither a charm nor guide need to be provided).

In some embodiments, the application 802 of step 1404 is a generic navigation application or a third-party application, for example Google Maps®. Neither the navigation nor third-party applications may include the outdoor experience specific features discussed above (e.g., the guide data, the geolocator 306 data, presets, algorithms, etc.), but may allow the user to input the geolocator 306 information (e.g., the GPS coordinates). Following the user inputting the geolocator 306 (e.g., the GPS coordinates), the application 802 may display in a graphical user interface the outdoor experience location 500 on (a virtual) map 504, and/or the user's current location, the route 502, or the instructions 506 (e.g., turn-by-turn directions). In other words, the application 802 may display the guide 104 that includes the map 504, the route 502, and the instructions 506 to get the user to the outdoor experience location 500. In this regard, the generic navigation or third-party application may provide that process 1400 may be a continuation of step 1206 of FIG. 12 (e.g., a guide does not need to be provided).

At step 1406, the OES 600 guides the end user to the outdoor experience location 500. As discussed above with regard to step 1302 of FIG. 13, the OES 600 or a specifically developed application (e.g., the application 802) may guide the end user to the outdoor experience location 500. The application 802 may include a graphical user interface with a display of the map 504, the route 502, the instructions 506, and/or any other guide data relating to outdoor experience 100, as discussed above.

At step 1408, the OES 600 determines when the end user is at the outdoor experience location 500. As discussed above, the OES 600 or the application 802 may determine when the user is within the predetermined distance from the outdoor experience location 500 (e.g., based on a preset, user preference, or system preference). The OES 600 and/or the application 802 may notify the user in a graphical user interface when the end user has arrived at the outdoor experience location 500 (e.g., outdoor experience icon 1102 indicates "Outdoor Experience Reached").

Following step 1408, the process 1400 proceeds to step 1410 and the OES 600 instructs the end user to take a picture. For example, the OES 600 instructs the end user to take a picture in the application 802. As discussed above, the user device 706 may provide a display on a graphical user interface (e.g., in the application 802) that may display a preview of a picture of outdoor experience 100, and instructions for the user to take a picture (e.g., the take picture icon 1106 of FIG. 11). The application 802 may also instruct the user to take a picture of the outdoor experience 100 with or without certain items or things (e.g., the charm bracelet 102, the end user, etc.), as discussed above.

Following step 1410, the process 1400 proceeds to step 1412 and the OES 600 instructs the end user to share the picture taken in step 1410. For example, the OES 600 instructs the end user to share the picture of the outdoor experience on the application 802. As discussed above, the user device 706 may provide a display on a graphical user interface (e.g., in the application 802) that may display a picture of the outdoor experience 100 (e.g., the outdoor experience picture 1104 of FIG. 11), and instructions for the user to share the picture (e.g., the post picture icon 1108 of FIG. 11) on the application 802. The instructions in the application 802 may also instruct the user to share the picture to a different application, online, or to any other suitable social media platform or public forum, as discussed above.

At step 1414 the OES 600 provides the end user with an achievement. For example, the OES 600 provides an achievement in the application 802. As discussed above, the application 802 may provide the achievement after the application 802 determines the user is at the outdoor experience location 500 (e.g., following step 1408), after the end user takes a picture at the outdoor experience location 500 in the application 802 (e.g., following step 1410), and/or after the end user shares the picture of the outdoor experience 100 in the application 802 (e.g., following step 1412).

In some embodiments, the application 802 provides the achievement after a number of other users have interacted with the picture of the outdoor experience 100 (e.g., viewed, liked, given the "thumbs up," saved, etc.) and a number of likes greater than a likes threshold have been provided. The application 802 may display the number of achievements the user has achieved, the number of achievements needed to receive a prize, the number of interactions needed to receive a prize, and/or if the user has achieved enough achievements to be provided a prize, as discussed above.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

For the purpose of this disclosure, the term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 6, it should be understood that the OES controller 604 may include any number of circuits for completing the functions described herein. For example, the activities and functionalities of the adventure seeker network circuit 624, the national outdoor experience circuit 628, the local outdoor experience circuit 632, and/or the mobile user device circuit 636 may be combined in multiple circuits or as a single circuit. Additional circuits with additional functionality may also be included. Further, the OES controller 604 may further control other activity beyond the scope of the present disclosure.

As mentioned above and in one configuration, the "circuits" may be implemented in machine-readable medium for execution by various types of processors, such as the processor 612 of FIG. 6. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

It should be noted that although the figures and description may illustrate a specific order of method steps, the order of such steps may differ from what is depicted and described, unless specified differently above. For example, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system, apparatus, method, and kit as shown in the various exemplary embodiments is illustrative only. Additionally, any element disclosed in one embodiment may be incorporated or utilized with any other embodiment disclosed herein. For example, the charm bracelet 102 (e.g., the charm 108 and the string 110) and the guide 104 of the exemplary embodiment described in at least paragraph(s) 22-31 may be incorporated in the OES 600 or the OES 700 of the exemplary embodiment described in at least paragraph(s) 32-67. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method, comprising:
    receiving user data associated with an end user and guide data associated with a plurality of outdoor experiences, wherein the user data includes a list of historic experiences of the end user and the guide data associated with each of the plurality of outdoor experiences includes global positioning system (GPS) coordinates;
    receiving, from a GPS device of a mobile device associated with the end user, GPS coordinates associated with a current location of the end user;
    determining, using the GPS coordinates associated with the current location of the end user, a subset of outdoor experiences selected from the plurality of outdoor experiences, wherein the subset of outdoor experiences is within a predetermined distance from the current location of the end user;
    receiving, from a plurality of sources, a difficulty rating associated with each of the subset of outdoor experiences and data indicating a number of visits to each of the subset of outdoor experiences over a predetermined period of time;
    generating, based on (i) the list of historic experiences of the end user, (ii) the difficulty rating associated with each of the subset of outdoor experiences, and (iii) the number of visits to each of the subset of outdoor experiences over the predetermined period of time, a hierarchy of the subset of outdoor experiences selected from the plurality of outdoor experiences, wherein the hierarchy of the list of outdoor experiences includes a plurality of recommended outdoor experiences for the end user;

selecting, based on a statistical analysis of third-party reviews of the hierarchy of outdoor experiences, an outdoor experience from the hierarchy of outdoor experiences without input from the end user;
providing a charm after selecting the outdoor experience, the charm including a radio frequency identification (RFID) device embedded within the charm, wherein, in response to a short range communication between the charm and the mobile device associated with the end user, the RFID device is configured to communicate data to cause the mobile device to generate a first graphical user interface including (i) the GPS coordinates corresponding to the selected outdoor experience and (ii) a guide including a route associated with the selected outdoor experience;
receiving, from the GPS device of the mobile device associated with the end user, real-time GPS coordinates associated with the end user to track a location of the end user along the route;
determining, using the tracked location of the end user, that the end user is at a location associated with the selected outdoor experience; and
generating and providing, based on the determination that the end user is at the location associated with the selected outdoor experience, a second graphical user interface for display on the mobile device, the second graphical user interface including a first selectable icon associated with capturing a visual depiction of the end user with the charm and a second selectable icon associated with providing the visual depiction to at least one media platform;
determining, in response to the end user interacting with the first selectable icon to capture the visual depiction of the end user with the charm and the end user interacting with the second selectable icon to provide the visual depiction to the at least one media platform, the end user has obtained an achievement; and
generating and providing, in response to determining the achievement has been obtained, a third graphical user interface for display on the mobile device, the third graphical user interface including a notification that the end user is to receive a prize and instructions for the end user to claim the prize.

2. The method of claim 1, further comprising providing the hierarchy of outdoor experiences based on information from at least one of an adventure consultant, a park affiliate, a local network, or a crowdsourcing group.

3. The method of claim 1, further comprising including on the charm at least one of a symbol, a name, or a barcode.

4. The method of claim 1, further comprising guiding the end user, by the guide accompanying the charm and the route associated with the selected outdoor experience, to the GPS coordinates of the selected outdoor experience.

5. The method of claim 4, further comprising instructing the end user, by a set of instructions included in the guide, to take a picture at the GPS coordinates of the selected outdoor experience.

6. The method of claim 5, further comprising instructing the end user, by the set of instructions included in the guide, to share the picture at the GPS coordinates of the selected outdoor experience in a mobile application.

7. The method of claim 1, further comprising providing a mobile application associated with the plurality of outdoor experiences.

8. The method of claim 7, further comprising guiding the end user to the GPS coordinates of the selected outdoor experience using the mobile application.

9. The method of claim 7, further comprising:
determining, with the mobile application, when the end user is at the GPS coordinates of the outdoor experience; and
instructing the end user to take a picture with the mobile application.

10. The method of claim 7, further comprising:
determining, with the mobile application, when the end user is at the GPS coordinates of the selected outdoor experience; and
providing, with the mobile application, the end user with a virtual badge.

11. The method of claim 10, further comprising:
determining, with the mobile application, a number of virtual badges the end user has been provided; and
in response to determining the number of virtual badges the end user has been provided is larger than a predetermined threshold, with the mobile application, providing the end user with a prize.

12. A kit, comprising:
a wearable charm including a geolocator including global positioning system (GPS) coordinates associated with an outdoor experience selected from a hierarchy of a subset of outdoor experiences selected from a plurality of outdoor experiences, wherein the subset of outdoor experiences are within a predetermined distance from a current location of an end user and the hierarchy of the subset of outdoor experiences is selected based on (i) a list of historic experiences of an end user, (ii) a difficulty rating associated with each of the subset of outdoor experiences, and (iii) a number of visits to each of the subset of outdoor experiences over a predetermined period of time, and wherein the outdoor experience is selected from the hierarchy of the subset of outdoor experiences based on a statistical analysis of third-party reviews of the hierarchy of outdoor experiences and without input from the end user, wherein the wearable charm includes a radio frequency identification (RFID) device embedded within the charm, wherein, in response to a short range communication between the charm and a mobile device associated with the end user, the RFID device is configured to communicate data to cause the mobile device to generate a first graphical user interface including (i) the GPS coordinates corresponding to the selected outdoor experience and (ii) a guide; and
the guide accompanying the wearable charm including a route associated with the outdoor experience, wherein in response to determining the end user traveled along the route to a location associated with the selected outdoor experience the end user is provided with a second graphical user interface for display on the mobile device, the second graphical user interface including a first selectable icon associated with capturing a visual depiction of the end user with the charm and a second selectable icon associated with providing the visual depiction to at least one media platform, and wherein in response to the end user interacting with the first selectable icon to capture the visual depiction of the end user with the charm and the end user interacting with the second selectable icon to provide the visual depiction to the at least one media platform, the end user is provided with a third graphical user interface including an indication an achievement has been obtained and instructions for the end user to claim a prize.

13. The kit of claim 12, further comprising a string having the ability to couple to the wearable charm and couple to the end user.

14. The kit of claim 12, further comprising a mobile application accompanying the selected outdoor experience, including digital data associated with the selected outdoor experience, the end user, and the route associated with the selected outdoor experience.

15. An outdoor experience system comprising:
one or more processing circuits comprising one or more memory devices coupled to one or more processors, the one or more memory devices configured to store instructions thereon that, when executed by the one or more processors, cause the one or more processors to perform operations comprising:
receiving user data associated with an end user and guide data associated with a plurality of outdoor experiences, wherein the user data includes a list of historic experiences of the end user and the guide data associated with each of the plurality of outdoor experiences includes global positioning system (GPS) coordinates;
receiving, from a GPS device of a mobile device associated with the end user, GPS coordinates associated with a current location of the end user;
determining, using the GPS coordinates associated with the current location of the end user, a subset of outdoor experiences selected from the plurality of outdoor experiences, wherein the subset of outdoor experiences is within a predetermined distance from the current location of the end user;
receiving, from a plurality of sources, a difficulty rating associated with each of the subset of outdoor experiences and data indicating a number of visits to each of the subset of outdoor experiences over a predetermined period of time;
generating, based on (i) the list of historic experiences of the end user, (ii) the difficulty rating associated with each of the subset of outdoor experiences, and (iii) the number of visits to each of the subset of outdoor experiences over the predetermined period of time, a hierarchy of the subset of outdoor experiences selected from the plurality of outdoor experiences, wherein the hierarchy of the list of outdoor experiences includes a plurality of recommended outdoor experiences for the end user;
selecting, based on a statistical analysis of third-party reviews of the hierarchy of outdoor experiences, an outdoor experience from the hierarchy of outdoor experiences without input from the end user;
providing a charm including a radio frequency identification (RFID) device embedded within the charm, wherein, in response to a short range communication between the charm and the mobile device associated with the end user, the RFID device is configured to communicate data to cause the mobile device to generate a first graphical user interface including (i) the GPS coordinates corresponding to the selected outdoor experience and (ii) a route associated with the selected outdoor experience associated with the charm to the end user;
receiving, from the GPS device of the mobile device associated with the end user, real-time GPS coordinates associated with the end user to track a location of the end user along the route;
determining, using the tracked location of the end user, that the end user is at the GPS coordinates associated with the selected outdoor experience; and
generating and providing, based on the determination that the end user is at the GPS coordinates associated with the selected outdoor experience, a second graphical user interface for display on the mobile device, the second graphical user interface including a first selectable icon associated with capturing a visual depiction of the end user with the charm and a second selectable icon associated with providing the visual depiction to at least one media platform;
determining, in response to the end user interacting with the first selectable icon to capture the visual depiction of the end user with the charm and the end user interacting with the second selectable icon to provide the visual depiction to the at least one media platform, the end user has obtained an achievement; and
generating and providing, in response to determining the achievement has been obtained, a third graphical user interface for display on the mobile device, the third graphical user interface including a notification that the end user is to receive a prize and instructions for the end user to claim the prize.

16. The outdoor experience system of claim 15, the operations further comprising guiding the end user to the GPS coordinates of the selected outdoor experience.

17. The outdoor experience system of claim 15, the operations further comprising:
determining when the end user is at the GPS coordinates of the selected outdoor experience; and
instructing the end user to take a picture with a mobile user interface.

18. The outdoor experience system of claim 15, the operations further comprising:
determining when the end user is at the GPS coordinates of the selected outdoor experience; and
providing the end user with a virtual badge with a mobile user interface.

19. The outdoor experience system of claim 18, the operations further comprising:
determining a number of virtual badges the end user has been provided; and
in response to determining the number of virtual badges the end user has been provided is larger than a predetermined threshold, providing, with the mobile user interface, the end user with the prize.

20. The outdoor experience system of claim 15, the operations further comprising:
providing GPS coordinates of the current location of the end user, along the route associated with the selected outdoor experience, using a mobile user interface;
providing the end user with an estimated time from the GPS coordinates of the current location of the end user to the GPS coordinates of the selected outdoor experience, according to the route associated with the selected outdoor experience, using the mobile user interface; and
guiding the end user to the GPS coordinates of the selected outdoor experience, according to the route associated with the selected outdoor experience, using the mobile user interface.

* * * * *